(12) United States Patent
Kusashima et al.

(10) Patent No.: US 11,924,664 B2
(45) Date of Patent: Mar. 5, 2024

(54) COMMUNICATION DEVICE, COMMUNICATION METHOD, AND PROGRAM

(71) Applicant: Sony Group Corporation, Tokyo (JP)

(72) Inventors: Naoki Kusashima, Tokyo (JP);
Hiromasa Uchiyama, Tokyo (JP);
Hiroki Matsuda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 338 days.

(21) Appl. No.: 17/298,950

(22) PCT Filed: Dec. 3, 2019

(86) PCT No.: PCT/JP2019/047103
§ 371 (c)(1),
(2) Date: Jun. 2, 2021

(87) PCT Pub. No.: WO2020/144973
PCT Pub. Date: Jul. 16, 2020

(65) Prior Publication Data
US 2022/0070706 A1    Mar. 3, 2022

(30) Foreign Application Priority Data
Jan. 10, 2019   (JP) .................................. 2019-002350

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0048* (2013.01); *H04W 48/20* (2013.01); *H04W 52/0206* (2013.01); *H04W 64/00* (2013.01)

(58) Field of Classification Search
CPC . H04W 24/10; H04W 48/20; H04W 52/0206; H04W 64/00
See application file for complete search history.

(56) References Cited

U.S. PATENT DOCUMENTS

2013/0229931 A1*  9/2013  Kim ..................... H04L 5/0053
                                                                       370/252
2014/0171086 A1*  6/2014  Nakamori ......... H04W 36/0088
                                                                       455/436
(Continued)

FOREIGN PATENT DOCUMENTS

| JP | 2013-529869 A | 7/2013 |
| WO | 2018/124028 A1 | 7/2018 |
| WO | 2018/139007 A1 | 8/2018 |

OTHER PUBLICATIONS

International Search Report and Written Opinion dated Jan. 7, 2020, received for PCT Application PCT/JP2019/047103, filed on Dec. 3, 2019, 12 pages including English Translation.

(Continued)

*Primary Examiner* — Derrick V Rose
(74) *Attorney, Agent, or Firm* — XSENSUS LLP

(57) ABSTRACT

A communication device includes: a communication unit that performs wireless communication; a notification unit that notifies another communication device of first information regarding setting related to measurement of a communication environment with the other communication device transmitting a reference signal, on the basis of predetermined conditions; and an acquisition unit that acquires second information regarding the setting from the other communication device.

23 Claims, 12 Drawing Sheets

(51) Int. Cl.
    *H04W 48/20*     (2009.01)
    *H04W 52/02*     (2009.01)
    *H04W 64/00*     (2009.01)

(56) References Cited

U.S. PATENT DOCUMENTS

2016/0373951 A1\*   12/2016   Callender ............. H04W 24/10
2020/0344633 A1\*   10/2020   Zhang ............... H04W 36/0088

OTHER PUBLICATIONS

CATT et al., "New SID: Study on UE Power Saving in NR", 3GPP TSG RAN Meetings #80, RP-181463, Jun. 11-14, 2018, 5 pages.
Vivo, "Summary of UE Power Consumption Reduction in RRM", 3GPP TSG RAN WG1 Meeting #95, R1-1814286, Nov. 12-16, 2018, pp. 1-18.
3GPP, "3rd Generation Partnership Project; Technical Specification Group Radio Access Network; NR; Study on UE Power Saving (Release 16)", 3GPP TR 38.840, V0.1.0, Nov. 2018, 3rd Generation Partnership Project (3GPP), Technical Report, total 24 pages.
CATT, "Study on UE Power Saving in NR", 3GPP TSG RAN meeting #82, RP-182355, Status Report to TSG, Dec. 10-13, 2018, Sorrento, Italy, total 23 pages.

\* cited by examiner

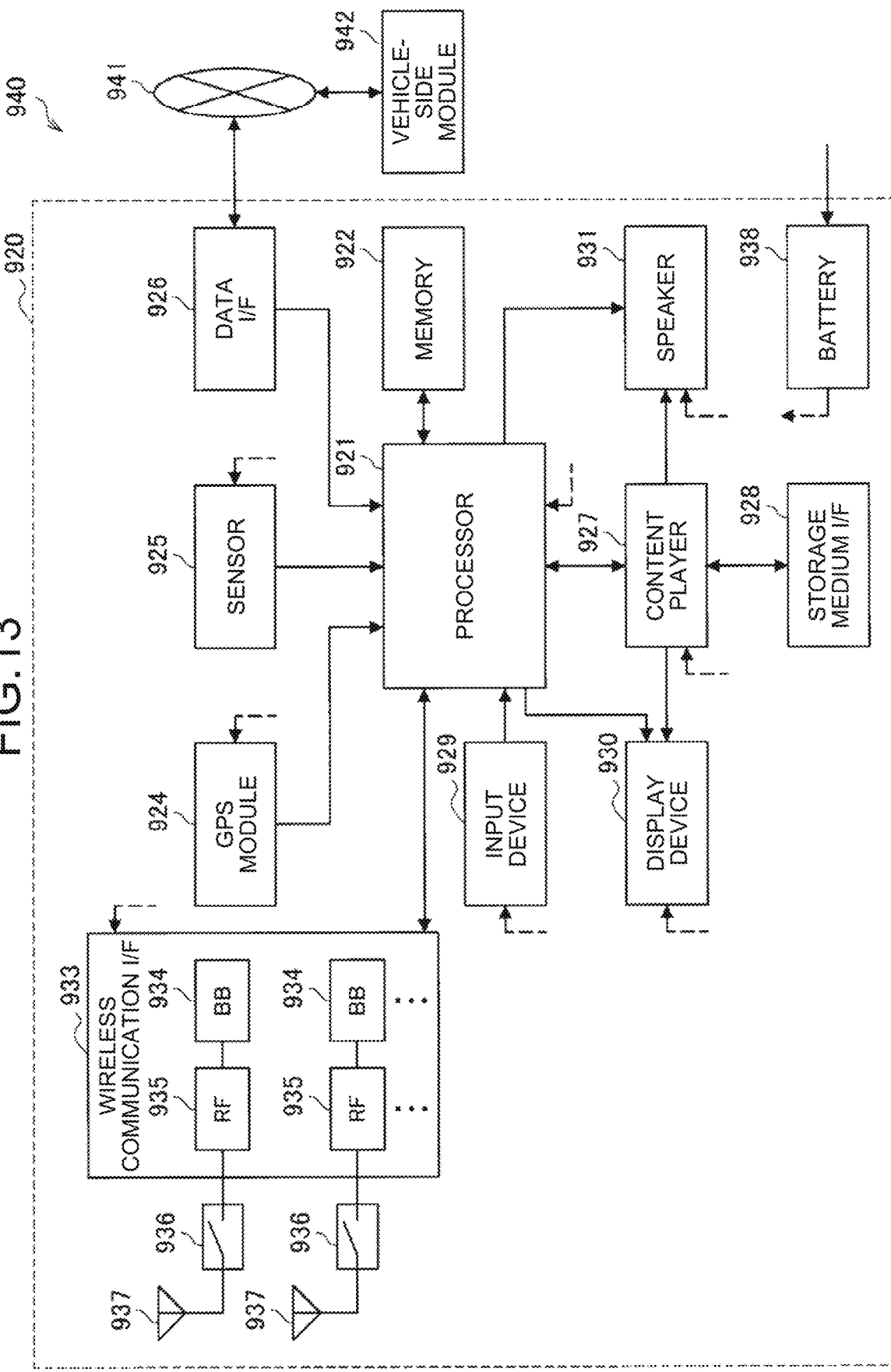

COMMUNICATION DEVICE, COMMUNICATION METHOD, AND PROGRAM

CROSS-REFERENCE TO RELATED APPLICATIONS

The present application is based on PCT filing PCT/JP2019/047103, filed Dec. 3, 2019, which claims priority to JP 2019-002350, filed Jan. 10, 2019, the entire contents of each are incorporated herein by reference.

FIELD

The present disclosure relates to a communication device, a communication method, and a program.

BACKGROUND

A radio access system and a wireless network (hereinafter, also called "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") for cellular mobile communication have been examined in the 3rd Generation Partnership Project (3GPP). Note that, in the following description, LTE includes LTE-A, LTE-A Pro, and EUTRA, and NR includes NRAT and FEUTRA. In LTE, a base station device (base station) is also called evolved NodeB (eNodeB), in NR, the base station device (base station) is also called gNodeB, and in LTE and NR, a terminal device (a mobile station, a mobile station device, and a terminal) is also called User Equipment (UE). LTE and NR are cellular communication systems in which a plurality of areas covered by base station devices are arranged in a cell shape. A single base station device may manage a plurality of cells.

NR is Radio Access Technology (RAT), which is different from LTE, as a next-generation radio access system for LTE. NR is access technology that can support various use cases including Enhanced mobile broadband (eMBB), Massive machine type communications (mMTC), and Ultra reliable and low latency communications (URLLC). NR is examined aiming at a technical framework that corresponds to use scenarios, requirements, and arrangement scenarios in those use cases.

The battery life of the terminal device is an important factor for the user experience, and further power reduction technology is examined in NR. In periods and/or conditions where reception is not required, it is possible to extend the battery life of the terminal device by stopping the reception or the like. The details of the power reduction technology are disclosed in Non Patent Literature 1.

CITATION LIST

Non Patent Literature

Non Patent Literature 1: RP-181463, "New SID: Study on UE Power Saving in NR", 3GPP TSG RAN Meeting #80, La Jolla, USA, Jun. 11-14, 2018.

SUMMARY

Technical Problem

On the other hand, in view of the conventional cell measurement (RRM measurement), a communication environment such as the signal reception quality from a cell may be measured even in a situation where the measurement is not always necessary. In such a case, a situation where the measurement is performed more than necessary and power consumption of the terminal device increases as a result can be assumed.

Accordingly, the present disclosure proposes technology capable of more suitably controlling measurement of a communication environment where NR is applied according to a situation at each time in the communication environment.

Solution to Problem

According to the present disclosure, a communication device is provided that includes: a communication unit that performs wireless communication; a notification unit that notifies another communication device of first information regarding setting related to measurement of a communication environment with the other communication device transmitting a reference signal, on the basis of predetermined conditions; and an acquisition unit that acquires second information regarding the setting from the other communication device.

Moreover, according to the present disclosure, a communication device is provided that includes: a communication unit that performs wireless communication; an acquisition unit that acquires first information regarding setting related to measurement of a communication environment with a terminal device, which is transmitted from the terminal device on the basis of predetermined conditions; a notification unit that notifies the terminal device of second information regarding the setting; and a control unit that performs control so that a reference signal used for the measurement is transmitted according to the setting.

Moreover, according to the present disclosure, a communication method, by a computer, is provided that includes: performing wireless communication; notifying another communication device of first information regarding setting related to measurement of a communication environment with the other communication device transmitting a reference signal, on the basis of predetermined conditions; and acquiring second information regarding the setting from the other communication device.

Moreover, according to the present disclosure, a communication method, by a computer, is provided that includes: performing wireless communication; acquiring first information regarding setting related to measurement of a communication environment with a terminal device, which is transmitted from the terminal device on the basis of predetermined conditions; notifying the terminal device of second information regarding the setting; and performing control so that a reference signal used for the measurement is transmitted according to the setting.

Moreover, according to the present disclosure, a program is provided that causes a computer to execute: performing wireless communication; notifying another communication device of first information regarding setting related to measurement of a communication environment with the other communication device transmitting a reference signal, on the basis of predetermined conditions; and acquiring second information regarding the setting from the other communication device.

Moreover, according to the present disclosure, a program is provided that causes a computer to execute: performing wireless communication; acquiring first information regarding setting related to measurement of a communication environment with a terminal device, which is transmitted from the terminal device on the basis of predetermined conditions; notifying the terminal device of second information regarding the setting; and performing control so that a reference signal used for the measurement is transmitted according to the setting.

BRIEF DESCRIPTION OF DRAWINGS

FIG. 13 is a block diagram illustrating an example of a schematic configuration of a car navigation device.

DESCRIPTION OF EMBODIMENTS

Figure 1:
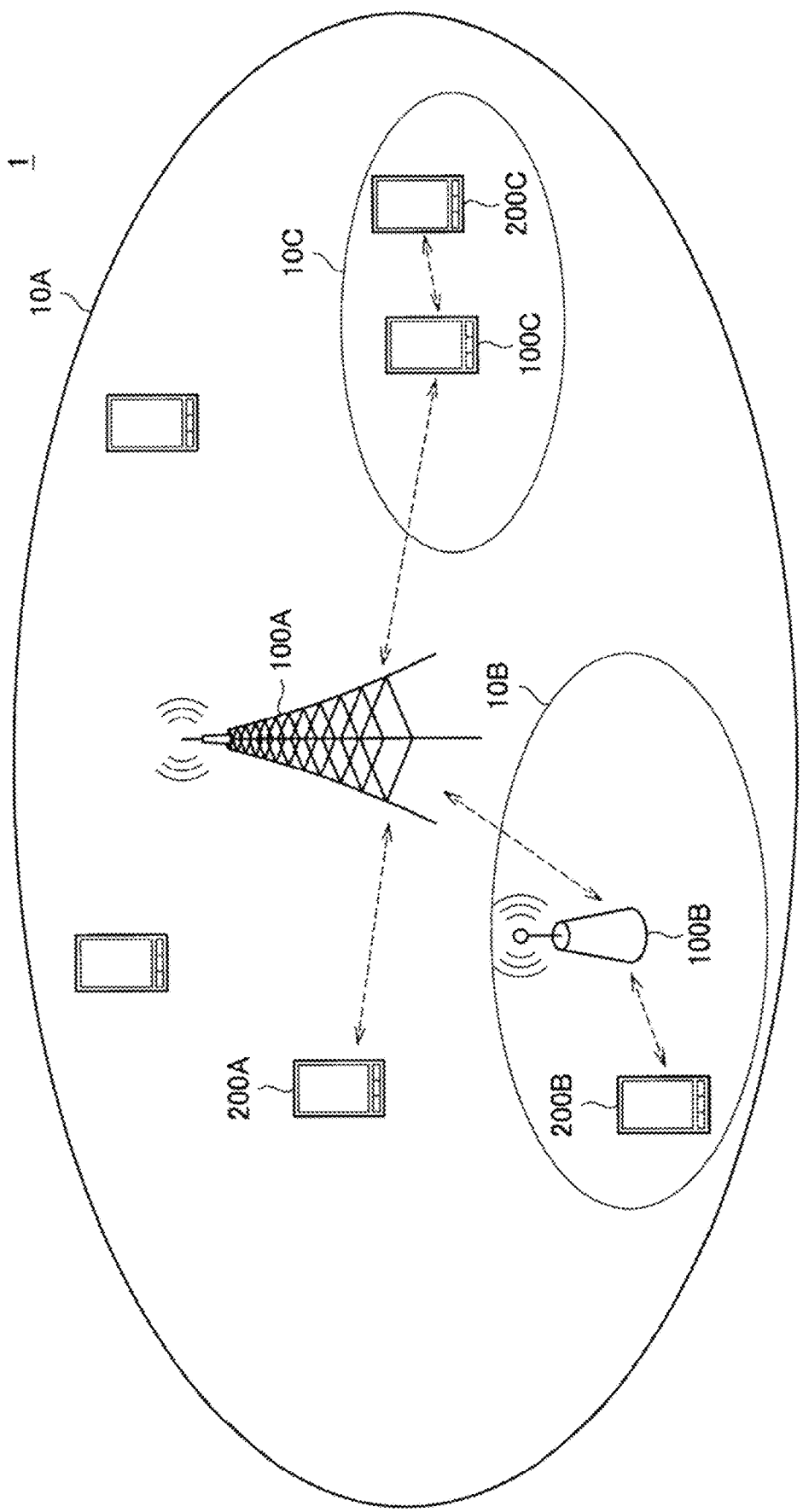
FIG. 1 is an explanatory diagram for explaining an example of a schematic configuration of a system according to an embodiment of the present disclosure.

Hereinafter, preferred embodiments of the present disclosure will be described in detail with reference to the accompanying drawings. Note that, in the present specification and the drawings, redundant description of components having substantially the same functional configuration is omitted by assigning the same reference numerals.

Note that the description will be given in the following order.

1. Configuration example
1.1. Example of system configuration
1.2. Configuration example of base station
1.3. Configuration example of terminal device
2. Examination of power consumption
3. Technical features
4. Application example
4.1. Application example related to base station
4.2. Application example related to terminal device
5. Conclusion 1. Configuration Example <1.1. Example of System Configuration>

First, an example of a schematic configuration of a system 1 according to an embodiment of the present disclosure will be described with reference to FIG. 1. FIG. 1 is an explanatory diagram for explaining an example of the schematic configuration of the system 1 according to the embodiment of the present disclosure. As illustrated in FIG. 1, the system 1 includes a wireless communication device 100 and a terminal device 200. Here, the terminal device 200 is also called a user. The user may also be called a UE. A wireless communication device 100C is also called a UE-Relay. Here, the UE may be a UE defined in LTE or LTE-A, and the UE-Relay may be Prose UE to Network Relay discussed in 3GPP, more generally, communication equipment.

(1) Wireless Communication Device 100

The wireless communication device 100 is a device that provides a wireless communication service to a subordinate device. For example, a wireless communication device 100A is a base station of a cellular system (or a mobile communication system). The base station 100A performs wireless communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station by, for example, an X2 interface, and can transmit and receive control information and the like. Further, the base station 100A is logically connected to a so-called core network (not illustrated) by, for example, an S1 interface, and can transmit and receive control information and the like. Note that communication between these devices can be physically relayed by various devices.

Here, the wireless communication device 100A illustrated in FIG. 1 is a macrocell base station, and the cell 10A is a macrocell. On the other hand, the wireless communication devices 100B and 100C are master devices that operate small cells 10B and 10C, respectively. As an example, the master device 100B is a fixedly installed small cell base station. The small cell base station 100B establishes a wireless backhaul link with the macrocell base station 100A and establishes an access link with one or more terminal devices (for example, a terminal device 200B) within the small cell 10B. Note that the wireless communication device 100B may be a relay node defined by 3GPP. The master device 100C is a dynamic access point (AP). The dynamic AP 100C is a mobile device that dynamically operates the small cell 10C. The dynamic AP 100C establishes a wireless backhaul link with the macrocell base station 100A and establishes an access link with one or more terminal devices (for example, a terminal device 200C) within the small cell 10C. The dynamic AP 100C may be, for example, a terminal device equipped with hardware or software capable of operating as a base station or a radio access point. The small cell 10C in this case is a dynamically formed localized network (Localized Network/Virtual Cell).

The cell 10A may be operated according to any wireless communication system such as LTE, LTE-Advanced (LTE-A), LTE-ADVANCED PRO, GSM (registered trademark), UMTS, W-CDMA, CDMA2000, WiMAX, WiMAX2, or IEEE802.16.

Note that the small cell is a concept that can include various types of cells (for example, a femtocell, a nanocell, a picocell, and a microcell) smaller than the macrocell that are disposed so as to overlap with the macrocell or so as not to overlap with the macrocell. In an example, the small cell is operated by a dedicated base station. In another example, the small cell is operated by the terminal functioning as the master device temporarily operating as a small cell base station. A so-called relay node can also be considered as a form of small cell base station. A wireless communication device that functions as a master station of the relay node is also called a donor base station. The donor base station may mean DeNB in LTE, more generally, the master station of the relay node.

(2) Terminal Device 200

The terminal device 200 can perform communication in a cellular system (or a mobile communication system). The terminal device 200 performs wireless communication with a wireless communication device (for example, the base station 100A, or the master device 100B or 100C) of the cellular system. For example, the terminal device 200A receives a downlink signal from the base station 100A and transmits an uplink signal to the base station 100A.

Further, the terminal device 200 is not limited to the so-called UE. For example, a so-called low cost terminal (Low cost UE) such as an MTC terminal, an Enhanced MTC (eMTC) terminal, and an NB-IoT terminal may be applied as the terminal device 200. Further, an infrastructure terminal such as a Road Side Unit (RSU) or a terminal such as a Customer Premises Equipment (CPE) may be applied.

(3) Supplement

Although the schematic configuration of the system 1 has been illustrated above, the present technology is not limited to the example illustrated in FIG. 1. For example, as the configuration of the system 1, a configuration not including a master device, Small Cell Enhancement (SCE), Heterogeneous Network (HetNet), MTC network, or the like can be adopted. Further, as another example of the configuration of the system 1, the master device may be connected to the small cell and the cell may be constructed under the small cell.

<1.2. Configuration Example of Base Station>

Figure 2:
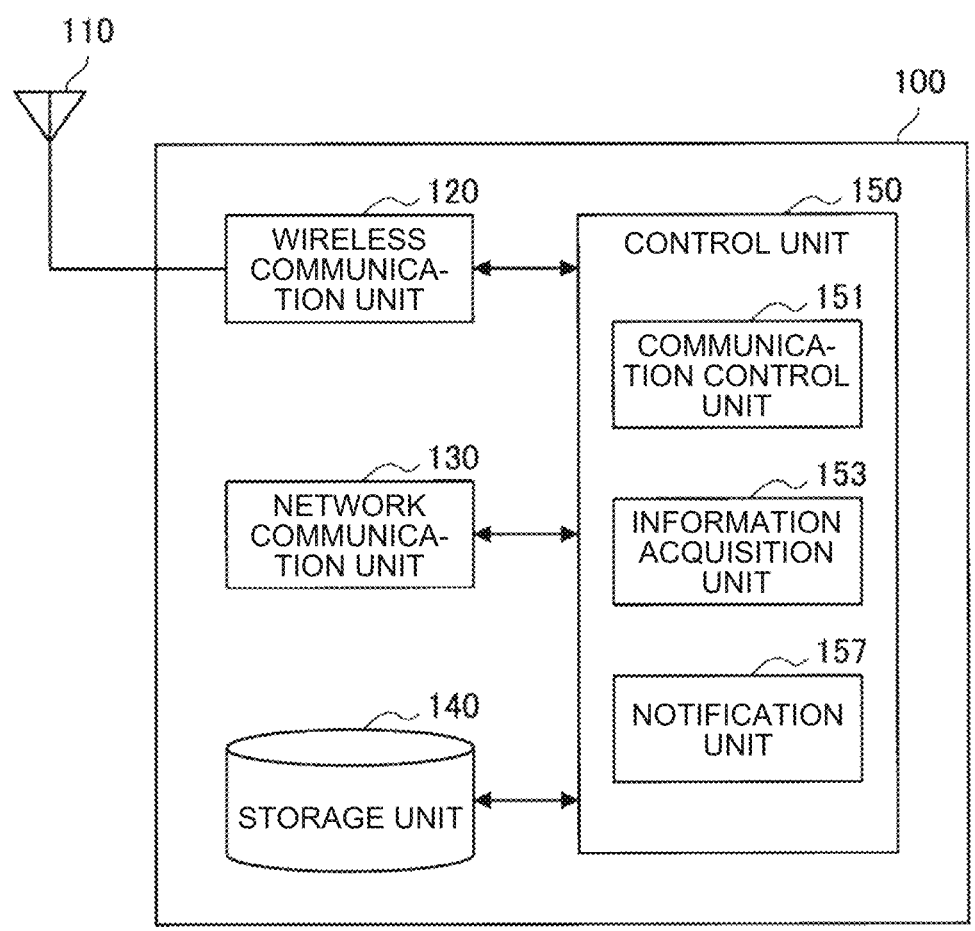
FIG. 2 is a block diagram illustrating an example of a configuration of a base station according to the embodiment.

Next, a configuration of a base station 100 according to the embodiment of the present disclosure will be described with reference to FIG. 2. FIG. 2 is a block diagram illustrating an example of the configuration of the base station 100 according to the embodiment of the present disclosure. Referring to FIG. 2, the base station 100 includes an antenna unit 110, a wireless communication unit 120, a network communication unit 130, a storage unit 140, and a control unit 150.

(1) Antenna Unit 110

The antenna unit 110 radiates a signal output by the wireless communication unit 120 into a space as a radio wave. Further, the antenna unit 110 converts the radio wave in the space into a signal and outputs the signal to the wireless communication unit 120.

(2) Wireless Communication Unit 120

The wireless communication unit 120 transmits and receives a signal. For example, the wireless communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, another node includes another base station and a core network node.

As described above, in the system 1 according to the present embodiment, the terminal device may operate as the relay terminal and relay communication between the remote terminal and the base station. In such a case, for example, the wireless communication device 100C corresponding to the relay terminal may not include the network communication unit 130.

(4) Storage Unit 140

The storage unit 140 temporarily or permanently stores programs and a variety of data for the operation of the base station 100.

(5) Control Unit 150

The control unit 150 provides various functions of the base station 100. The control unit 150 includes a communication control unit 151, an information acquisition unit 153, and a notification unit 157. Note that the control unit 150 can further include other components other than these components. That is, the control unit 150 can also perform operations other than the operations of these components.

The communication control unit 151 executes various processing related to the control of wireless communication with the terminal device 200 via the wireless communication unit 120. For example, the communication control unit 151 may control the allocation of resources to transmit a variety of information and data to the base station 100 by the terminal device 200. Further, the communication control unit 151 may control transmission of a reference signal (RS) that can be used by the terminal device 200 to measure a communication environment, such as a synchronization signal (SS) or a channel state information reference signal (CSI-RS). Further, the communication control unit 151 executes various processing related to the control of communication with another node (for example, another base station, a core network node, or the like) via the network communication unit 130.

The information acquisition unit 153 acquires a variety of information from the terminal device 200 or another node. As a specific example, the information acquisition unit 153 may acquire a variety of information (for example, a request for changing the setting of the measurement or the like) regarding setting related to the measurement of the communication environment by the terminal device 200 from the terminal device 200. The acquired information may be used, for example, for controlling wireless communication with the terminal device or controlling for cooperation with another node.

The notification unit 157 notifies the terminal device 200 or another node of a variety of information. For example, the notification unit 157 may notify the terminal device 200 of a variety of information to perform wireless communication with the base station 100 by the terminal device 200 within the cell. As a specific example, the notification unit 157 may notify the terminal device 200 of information regarding the setting related to the measurement of the communication environment with the terminal device 200 (for example, an update result of the setting and the like). Further, the notification unit 157 may notify another node (for example, another base station) of the information acquired from the terminal device 200 within the cell.

<1.3. Configuration Example of Terminal Device>

Figure 3:
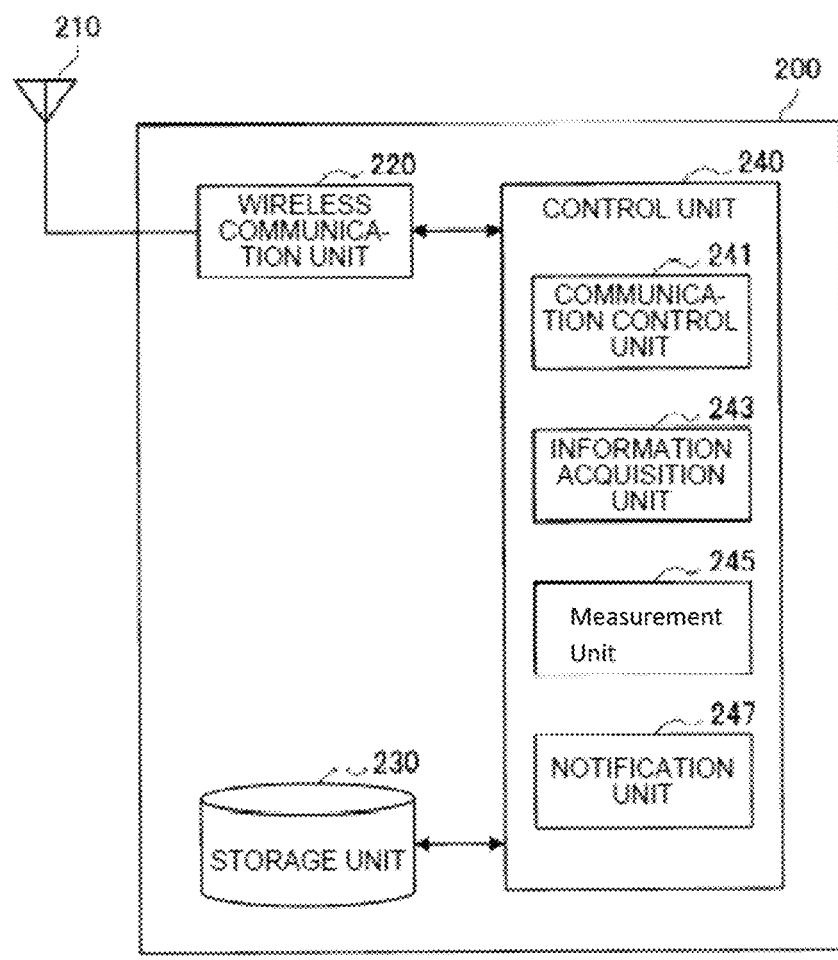
FIG. 3 is a block diagram illustrating an example of a configuration of a terminal device according to the embodiment.

Next, an example of a configuration of the terminal device 200 according to the embodiment of the present disclosure will be described with reference to FIG. 3. FIG. 3 is a block diagram illustrating an example of the configuration of the terminal device 200 according to the embodiment of the present disclosure. As illustrated in FIG. 3, the terminal device 200 includes an antenna unit 210, a wireless communication unit 220, a storage unit 230, and a control unit 240.

(1) Antenna Unit 210

The antenna unit 210 radiates a signal output by the wireless communication unit 220 into a space as a radio wave. Further, the antenna unit 210 converts the radio wave in the space into a signal and outputs the signal to the wireless communication unit 220.

(2) Wireless Communication Unit 220

The wireless communication unit 220 transmits and receives a signal. For example, the wireless communication unit 220 receives a downlink signal from the base station and transmits an uplink signal to the base station.

Further, in the system 1 according to the present embodiment, the terminal device 200 may directly communicate with another terminal device 200 without using the base station 100. In this case, the wireless communication unit 220 may transmit and receive a sidelink signal to and from another terminal device 200.

(3) Storage Unit 230

The storage unit 230 temporarily or permanently stores programs and a variety of data for the operation of the terminal device 200.

(4) Control Unit 240

The control unit 240 provides various functions of the terminal device 200. For example, the control unit 240 includes a communication control unit 241, an information acquisition unit 243, a measurement unit 245, and a notification unit 247. Note that the control unit 240 can further include other components other than these components. That is, the control unit 240 can also perform operations other than the operations of these components.

The communication control unit 241 executes various processing related to the control of wireless communication with the base station 100 or another terminal device 200 via the wireless communication unit 220. For example, the communication control unit 241 may control the frequency or timing of the measurement of the communication environment by the measurement unit 245 described later, according to various conditions. The details of the same processing will be described later.

The information acquisition unit 243 acquires a variety of information from the base station 100 or another terminal device 200. For example, the information acquisition unit 243 may acquire information regarding setting related to measurement of various states related to the communication environment with the base station 100 (hereinafter, also called "measurement of the communication environment") from the base station 100. As a specific example, the information acquisition unit 243 may acquire an update result of the setting related to the measurement of the communication environment from the base station 100. Further, as another example, the information acquisition unit 243 may acquire information regarding setting candidates related to the measurement of the communication environment from the base station 100.

The measurement unit 245 measures the communication environment with another communication device such as the base station 100. As a specific example, the measurement unit 245 may perform radio resource management (RRM) measurement using various reference signals transmitted from another communication device. Specific examples of the measurement of the communication environment include measurement of reference signal received power (RSRP) or reference signal received quality (RSRQ).

The notification unit 247 notifies the base station 100 or another terminal device 200 of a variety of information. For example, the notification unit 247 may notify the base station 100 of a variety of information regarding settings related to measurement of the communication environment with the base station 100. As a specific example, the notification unit 247 may notify the base station 100 of a request for changing the setting related to the measurement of the communication environment. Further, as another example, when the setting related to the measurement of the communication environment is updated, the notification unit 247 may notify the base station 100 of the update of the setting. Note that the notification destination of a variety of information regarding the setting related to the measurement of the communication environment is not necessarily limited to the base station 100.

2. Examination of Power Consumption

Subsequently, after explaining an outline of the influence of power consumption in NR, technical problems of the system according to the embodiment of the present disclosure will be described.

The battery life of the terminal device is an important factor for the user experience. In NR, the power consumption may be relatively high as compared with the conventional standard, and technology for further reducing the power consumption is examined.

On the other hand, in view of the conventional cell measurement (RRM measurement), a communication environment such as the signal reception quality from a cell may be measured even in a situation where the measurement is not always necessary. As a specific example, in a situation where the terminal device is stationary or a situation where the movement frequency of the terminal device is relatively low, a variation in the reception quality of the cell tends to be relatively small, and the measurement frequency of the communication environment may be low. That is, in such a case, a situation where the measurement of the communication environment is performed more than necessary and the power consumption increases as a result can be assumed. On the other hand, in a situation where the terminal device moves at high speed, the variation in the reception quality of the cell tends to be large, and it may be desirable to increase the measurement frequency of the communication environment.

Therefore, in the system according to the present disclosure, the measurement frequency of the communication environment is controlled according to a situation at each time, so that execution of unnecessary measurement is suppressed, and low power consumption is realized.

On the other hand, in LTE and NR, there are different parts in the control related to the measurement of the communication environment by the terminal device. Therefore, in NR, an additional mechanism for controlling the measurement frequency of the communication environment by the terminal device is required as compared with LTE.

Specifically, in a case of LTE, there are CRS-based measurement and CSI-RS-based measurement as methods for measuring the communication environment. In the CRS-based measurement, a reference signal is included in all subframes (slots). That is, the terminal device can measure the communication environment on the basis of the reference signal transmitted from the base station every predetermined period. Further, in the CSI-RS-based measurement in LTE, CSI-RS is allocated to a terminal group regardless of a condition or a state of each terminal device. That is, in this case, the terminal device measures the communication environment according to the setting by the base station.

On the other hand, in a case of NR, SS and CSI-RS are used to measure the communication environment. In NR, SS and CSI-RS are signals to be transmitted periodically, but they are not always included in all slots. That is, in NR, there is a possibility that a reference signal that can be used to measure the communication environment is not included in some slots, and the moment where the terminal device can measure the communication environment is limited to timing where the reference signal such as SS or CSI-RS is transmitted.

In view of the above situations, the present disclosure proposes technology for more suitably controlling measurement of a communication environment where NR is applied according to a situation at each time in the communication environment (for example, controlling the measurement frequency) and more suitably realizing low power consumption of the terminal device.

3. Technical Features

Subsequently, technical features of the system according to the embodiment of the present disclosure will be described below.

(Control to Vary Number of Measurements)

In the system according to the present embodiment, the number of cell or beam measurements (in other words, the measurement frequency) is varied according to various conditions for each terminal device. Specifically, the number of cell or beam measurements is controlled by controlling the number of times on a time axis, the number of times on a frequency axis, and the number of cells. The number of times on the time axis can be varied by controlling a measurement cycle or period, for example. The number of times on the frequency axis can be varied by controlling a center frequency or a bandwidth, for example.

Further, examples of a control method in which the number of measurements of the communication environment is varied include the following control methods.

Figure 4:
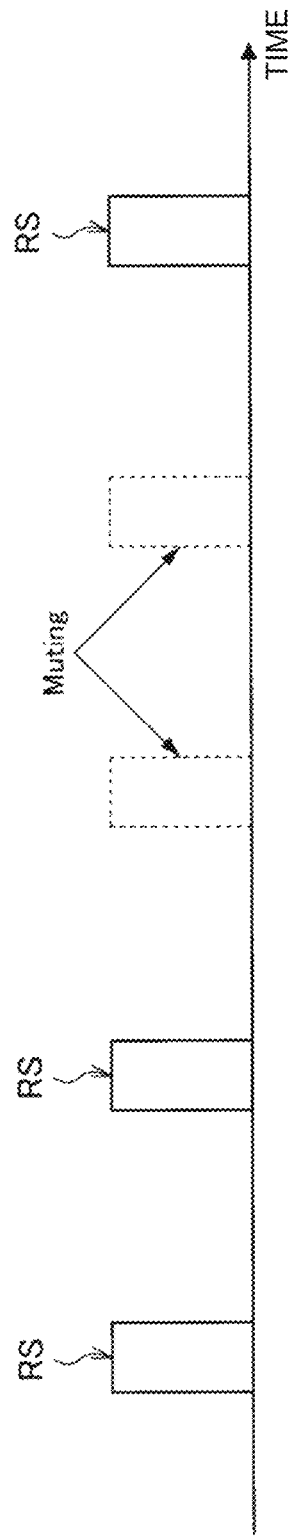
FIG. 4 is an explanatory diagram for explaining an example of a control method in which the number of measurements of a communication environment is varied.

Control to temporarily suppress measurement on the premise of periodic measurement Control of quasi-static (semi-persistent) measurement Combination of periodic measurement and dynamic measurement control Dynamic measurement control (1) Control to Temporarily Suppress Measurement on the Premise of Periodic Measurement For example, FIG. 4 is an explanatory diagram for explaining an example of a control method in which the number of measurements of a communication environment is varied, and illustrates an example of a control method in which measurement is temporarily suppressed on the premise of periodic measurement. In FIG. 4, a horizontal axis represents time. Further, a reference code RS indicates a reference signal that can be used for measuring the communication environment. That is, in the example illustrated in FIG. 4, the reference signal RS is periodically transmitted from the base station 100. Under the premise, the terminal device 200 skips the execution of the measurement during a period when the measurement of the communication environment is unnecessary. As a result, the number of measurements of the communication environment in the terminal device 200 (in other words, the measurement frequency) can be varied according to the number of measurements to be skipped.

Note that the unnecessary period or the number of measurements to be skipped may be requested by the terminal device 200 or may be preset by the base station 100.

(2) Control of Quasi-Static (Semi-Persistent) Measurement

Figure 5:
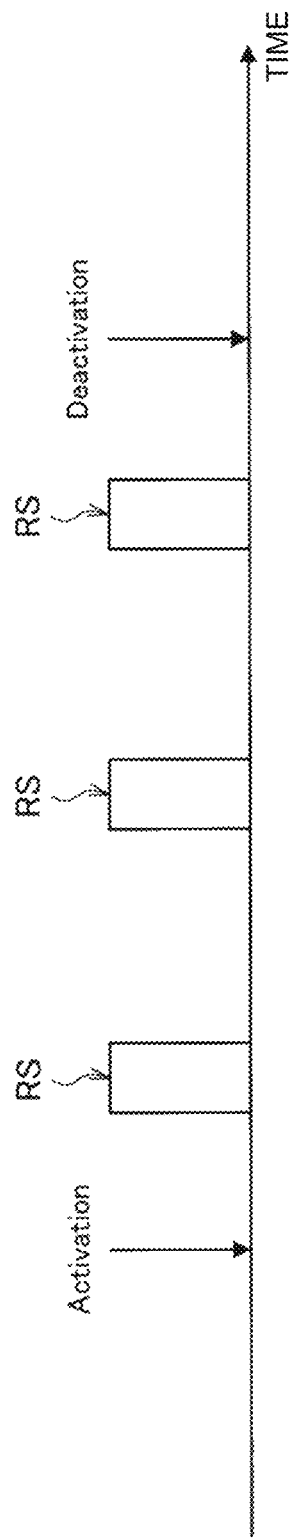
FIG. 5 is an explanatory diagram for explaining another example of the control method in which the number of measurements of a communication environment is varied.

Further, FIG. 5 is an explanatory diagram for explaining another example of the control method in which the number of measurements of the communication environment is varied, and illustrates an example of a quasi-static measurement control method. In FIG. 5, a horizontal axis represents time. Further, a reference code RS indicates a reference signal that can be used for measuring the communication environment. In the example illustrated in FIG. 5, setting related to the measurement of the communication environment (for example, setting of a cycle or a period where the reference signal is transmitted) is applied quasi-statically. That is, an application of desired setting related to the measurement of the communication environment is validated by an instruction (Activation) related to the start from the base station 100. That is, the terminal device 200 receives the instruction and starts the measurement according to the setting. Further, the application of the setting is invalidated by an instruction (Deactivation) related to the end from the base station 100. That is, the terminal device 200 receives the instruction and ends the measurement according to the setting. With the above control, it is possible to vary the number of measurements of the communication environment in the terminal device 200.

Note that a plurality of (three or more) settings may be switched through the instruction related to the start and the instruction related to the end. For example, when an instruction related to an index of the start and the setting is given, the terminal device 200 starts measurement using the instructed setting. When an instruction related to the end is given, the measurement is performed using the initial setting.

(3) Combination of Periodic Measurement and Dynamic Measurement Control

Figure 6:
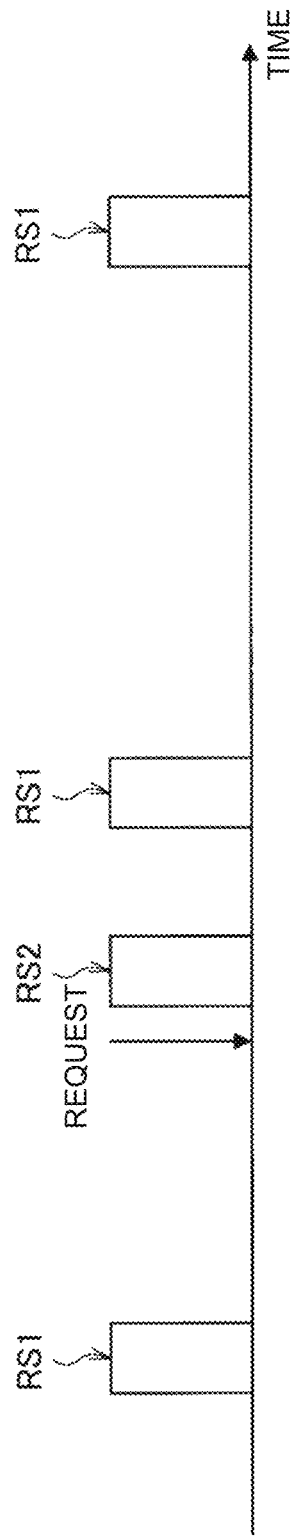
FIG. 6 is an explanatory diagram for explaining another example of the control method in which the number of measurements of a communication environment is varied.

Further, FIG. 6 is an explanatory diagram for explaining another example of the control method in which the number of measurements of the communication environment is varied, and illustrates an example of control when the periodic measurement and the dynamic measurement control are combined. In FIG. 6, a horizontal axis represents time. Further, each of reference codes RS1 and RS2 indicates a reference signal that can be used for measuring the communication environment. In the example illustrated in FIG. 6, the reference signal RS1 is periodically transmitted on the basis of predetermined setting. That is, the terminal device 200 can use the reference signal RS1 for measuring the communication environment. Further, in the example illustrated in FIG. 6, the terminal device 200 can request the base station 100 to transmit the reference signal at desired timing, if necessary. The base station 100 determines whether or not to accept the request of the terminal device 200, and when the request is accepted, the base station 100 transmits the reference signal RS2 according to the request. In this case, the terminal device 200 can use the reference signal RS2 in addition to the reference signal RS1 for measuring the communication environment. That is, in the example illustrated in FIG. 6, the reference signal RS2 is dynamically additionally transmitted according to the request from the terminal device 200, so that the number of measurements of the communication environment in the terminal device 200 can be varied.

(4) Dynamic Measurement Control

Figure 7:
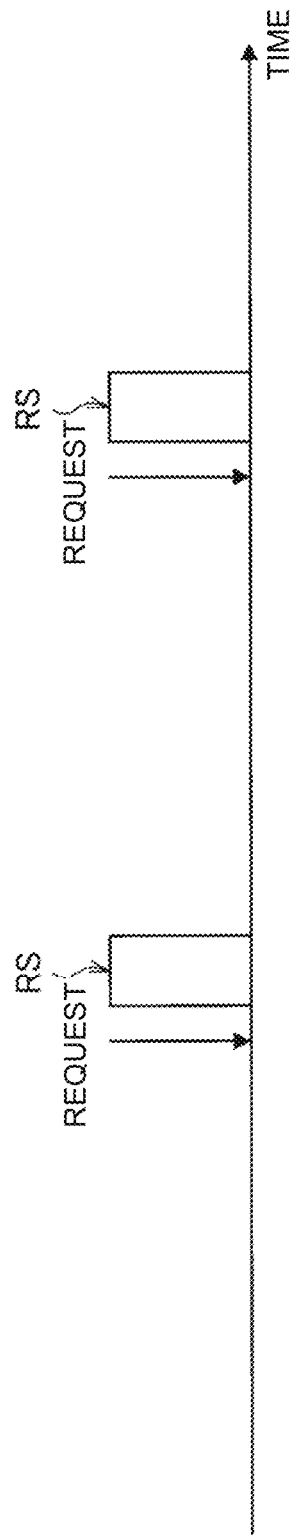
FIG. 7 is an explanatory diagram for explaining another example of the control method in which the number of measurements of a communication environment is varied.

Further, FIG. 7 is an explanatory diagram for explaining another example of the control method in which the number of measurements of the communication environment is varied, and illustrates an example of a dynamic measurement control method. In FIG. 7, a horizontal axis represents time. Further, a reference code RS indicates a reference signal that can be used for measuring the communication environment. In the example illustrated in FIG. 7, the terminal device 200 can request the base station 100 to transmit the reference signal at desired timing, if necessary. The base station 100 determines whether or not to accept the request of the terminal device 200, and when the request is accepted, the base station 100 transmits the reference signal RS2 according to the request. That is, in the example illustrated in FIG. 7, the reference signal RS2 is dynamically transmitted according to the request from the terminal device 200, so that the number of measurements of the communication environment in the terminal device 200 can be varied.

(Switching Conditions of Measurement Setting)

Subsequently, in the system according to the embodiment of the present disclosure, an example of conditions related to switching of the measurement setting such as the number of measurements (measurement frequency) of the communication environment will be described below.

(1) Control According to Speed of Terminal Device

The measurement frequency of the communication environment may be switched according to a movement speed of the terminal device 200. As a specific example, when the terminal device 200 moves at higher speed (for example, when the speed is equal to or higher than a threshold value), the measurement frequency of the communication environment may be controlled to be higher. In this case, for example, the setting may be performed so that the measurement cycle becomes shorter. On the other hand, when the terminal device 200 moves at lower speed (for example, when the speed is less than the threshold value), the measurement frequency of the communication environment may be controlled to be lower. In this case, for example, the setting may be performed so that the measurement cycle becomes longer.

Note that a method for measuring the movement speed of the terminal device 200 is not particularly limited. As a specific example, the terminal device 200 may measure its own movement speed on the basis of a measurement result of a position using a global navigation satellite system (GNSS) or the like. Further, the terminal device 200 may measure its own movement speed by using detection results of various sensors such as an acceleration sensor and an angular velocity sensor. Further, the movement speed of the terminal device 200 may be measured on the basis of the communication between the terminal device 200 and the base station 100. As a specific example, it is possible to measure the movement speed of the terminal device 200 on the basis of the switching frequency of the cell. Further, as another example, it is possible to measure the movement speed of the terminal device 200 on the basis of the Doppler shift of the uplink.

(2) Control According to Position of Terminal Device

The measurement frequency of the communication environment may be switched according to the position of the terminal device 200. As a specific example, when the position of the terminal device 200 is closer to the center of the cell, the number of adjacent cells to be measured may be controlled to be smaller. As a result, the measurement frequency of the communication environment becomes lower. On the other hand, when the position of the terminal device 200 is farther from the center of the cell (that is, the position is closer to a cell edge), the number of adjacent cells to be measured may be controlled to be larger. As a result, the measurement frequency of the communication environment becomes higher. Further, in a case of assuming a drone or the like as the communication device, when the altitude of the communication device is higher, the number of adjacent cells to be measured may be controlled to be larger Further, a beam to be measured may be limited according to the position of the terminal device 200.

Not that a method for specifying the position of the terminal device 200 is not particularly limited. As a specific example, the position of the terminal device 200 may be measured using GNSS. Further, the movement speed of the terminal device 200 may be measured on the basis of the communication between the terminal device 200 and the base station 100. As a specific example, the position of the terminal device 200 may be specified by using a method such as measurement based on Uplink-Time Difference Of Arrival (UTDOA) or measurement based on an arrival angle of the beam. Further, a device to be used for specifying the position of the terminal device 200 is not particularly limited, and for example, a sensor, a radar, a lidar, a multi-lens camera, or the like may be used. Further, the method for specifying the position of the terminal device 200 is not limited to the method measured by transmission and reception of the radio waves described above.

(3) Control According to Frequency to be Measured

The measurement frequency of the communication environment may be switched according to a frequency to be a measurement target of the communication environment by the terminal device 200. As a specific example, when the frequency used for the measurement of the communication environment is lower, attenuation during propagation is more gradual, so that the measurement frequency of the communication environment may be controlled to be lower. On the other hand, when the frequency used for the measurement of the communication environment is higher, the attenuation during propagation is larger, so that the measurement frequency of the communication environment may be controlled to be higher.

As the frequency to be the measurement target of the communication environment, the distinction between a high frequency and a low frequency may be determined by, for example, a frequency range. As a specific example, a frequency range defined as FR1 may be regarded as the low frequency, and a frequency range defined as FR2 may be regarded as the high frequency.

(4) Control According to Reception Quality from Serving Cell

The measurement frequency of the communication environment may be switched according to the reception quality from a serving cell. As a specific example, when the reception quality from the serving cell is higher, the terminal device 200 is more likely to be located closer to the center of the cell, so that the number of adjacent cells to be measured or the measurement frequency may be controlled to be smaller. On the other hand, when the reception quality from the serving cell is lower, the terminal device 200 is more likely to be located closer to the cell edge, so that the number of adjacent cells to be measured or the measurement frequency may be controlled to be larger. Examples of the reception quality from the serving cell include received power (RSRP), RSRQ, SINR, In-sync (IS) notification or Out-of-sync (OOS) notification in RLM measurement, and the like.

(5) Control According to Received Power or Interference Power from Adjacent Cell The measurement frequency of the communication environment may be switched according to received power or interference power (RSSI) from the adjacent cell (neighbor cell). As a specific example, when the received power from the adjacent cell is lower, the terminal device 200 is more likely to be located closer to the center of the cell, so that the number of adjacent cells to be measured may be controlled to be smaller. On the other hand, when the received power from the adjacent cell is higher, the terminal device 200 is more likely to be located closer to the cell edge, so that the number of adjacent cells to be measured may be controlled to be larger.

(6) Control According to Packet or Traffic Type

The measurement frequency of the communication environment may be switched according to a packet or traffic type. As a specific example, when traffic where a low latency request in a QoS request is higher arrives, the measurement frequency of the communication environment may be controlled to be higher. On the other hand, when traffic where a low latency request in the QoS request is lower arrives, the measurement frequency of the communication environment may be controlled to be lower.

(7) Control According to Accessibility

The measurement frequency of the communication environment may be switched according to accessibility. The accessibility is an index indicating communication reliability in an upper layer such as an application layer. As a specific example, when traffic with higher accessibility is handled, the measurement frequency of the communication environment may be controlled to be higher. On the other hand, when traffic with lower accessibility is handled, the measurement frequency of the communication environment may be controlled to be lower.

(8) Control According to State of Battery

The measurement frequency of the communication environment may be switched according to a state of a battery. As a specific example, when power charged in the battery is sufficient (for example, when the power is equal to or more than a threshold value), the measurement frequency of the communication environment may be controlled to be higher. On the other hand, when the power charged in the battery is lower (for example, when the power is insufficient), the measurement frequency of the communication environment may be controlled to be lower.

(9) Control According to Capability of Terminal Device

The measurement frequency of the communication environment may be switched according to the capability of the terminal device 200. As a specific example, when the processing capability of the terminal device 200 for wireless communication is higher, the measurement frequency of the communication environment may be controlled to be higher. On the other hand, when the processing capability of the terminal device 200 for wireless communication is lower, the measurement frequency of the communication environment may be controlled to be lower.

(10) Control According to Power Class

The measurement frequency of the communication environment may be switched according to a power class of the terminal device 200. As a specific example, in a case of the power class (for example, PC3) having higher maximum transmission power, the measurement frequency of the communication environment may be controlled to be higher. On the other hand, in a case of the power class having lower maximum transmission power, the measurement frequency of the communication environment may be controlled to be lower. Of course, when the setting of the maximum transmission power can be controlled without being limited to the setting of the power class, the measurement frequency of the communication environment may be controlled according to the setting of the maximum transmission power.

(Adaptation Procedure)

Subsequently, in the system according to the embodiment of the present disclosure, an example of an adaptation procedure for varying the number of measurements (measurement frequency) of the communication environment will be described below.

(1) Control Based on Request from Terminal Device to Base Station

Figure 8:
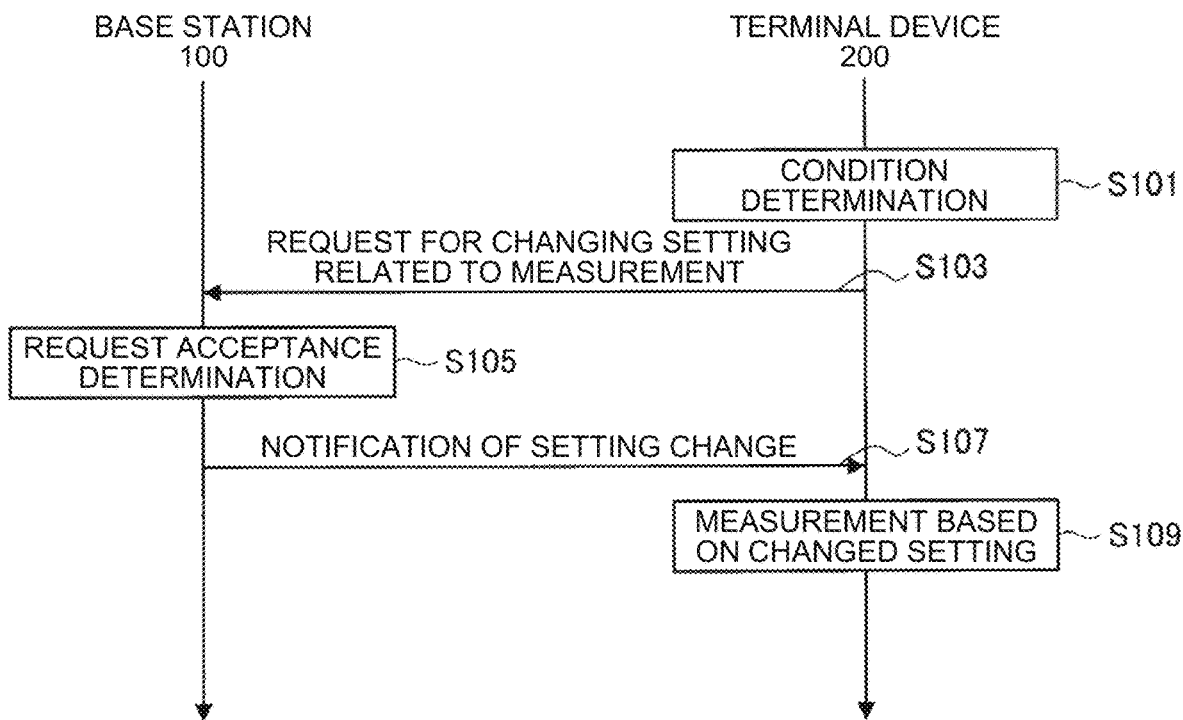
FIG. 8 is a sequence diagram illustrating an example of an adaptation procedure of the system according to the embodiment.

First, referring to FIG. 8, an example of a procedure of a case where the terminal device 200 transmits a request to the base station 100, and the base station 100 controls setting related to the transmission of the reference signal that can be used for measuring the communication environment according to the request (that is, the measurement frequency is controlled) will be described. FIG. 8 is a sequence diagram illustrating an example of the adaptation procedure of the system according to the embodiment of the present disclosure.

As illustrated in FIG. 8, the terminal device 200 determines whether or not predetermined conditions (for example, the various conditions described above) are satisfied (S101), and transmits a request for changing the setting related to the measurement of the communication environment to the base station 100, according to a determination result (S103). Upon receiving the above request from the terminal device 200, the base station 100 determines whether or not to accept the request, and when it is determined that the request is accepted, the base station 100 changes the setting related to the measurement of the communication environment according to the request (S105). Further, when the setting is changed, the base station 100 notifies the terminal device 200 of the setting change (S107). Examples of the notification include a notification that the setting has been changed according to the request from the terminal device 200, a notification of information regarding the changed setting, and the like. Then, when the terminal device 200 receives the above notification from the base station 100, the terminal device 200 starts executing processing related to the measurement of the communication environment based on the changed setting (S109). That is, after that, the transmission frequency of the reference signal from the base station 100 is controlled on the basis of the changed setting, and the terminal device 200 can measure the communication environment using the reference signal. As a result, the measurement frequency of the communication environment is controlled.

In the example illustrated in FIG. 8, the above request from the terminal device 200 to the base station 100 indicated by a reference numeral S103 corresponds to an example of "first information" regarding the setting related to the measurement of the communication environment. Further, the above notification from the base station 100 to the terminal device 200 indicated by a reference numeral S107 corresponds to an example of "second information" regarding the setting related to the measurement of the communication environment.

(2) Control Based on Selection from Plurality of Settings by Terminal Device

Figure 9:
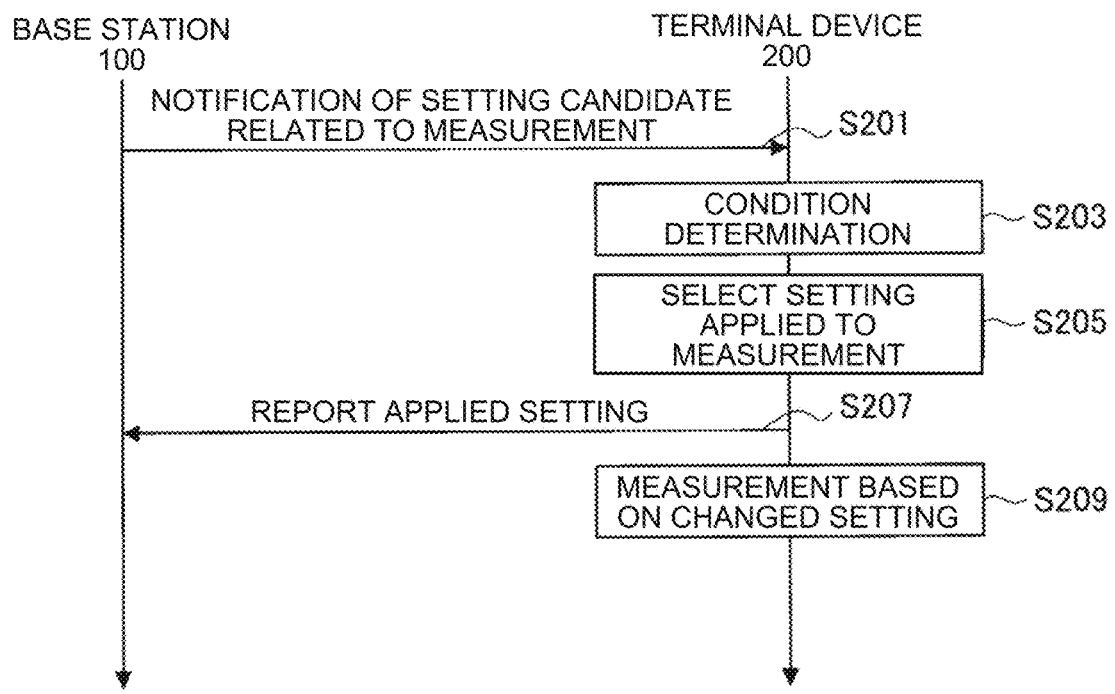
FIG. 9 is a sequence diagram illustrating another example of the adaptation procedure of the system according to the embodiment.

Then, referring to FIG. 9, an example of a procedure of a case where the terminal device 200 selects setting to be applied from a plurality of setting candidates, and the base station 100 controls the operation related to transmission of the reference signal that can be used for measuring the communication environment according to the selected setting (that is, the measurement frequency is controlled) will be described. FIG. 9 is a sequence diagram illustrating another example of the adaptation procedure of the system according to the embodiment of the present disclosure.

In the example illustrated in FIG. 9, first, the base station 100 previously notifies the terminal device 200 of candidates of various settings related to the measurement of the communication environment (S201). After the notification, the terminal device 200 determines whether or not predetermined conditions (for example, the various conditions described above) are satisfied (S203), and selects the setting to be applied to the measurement of the communication environment from the above candidates previously notified by the base station 100, according to a determination result (S205). Next, the terminal device 200 reports the selected setting (for example, the applied setting) to the base station 100 (S207). In this case, the base station 100 changes the setting related to the measurement of the communication environment, according to the report from the terminal device 200. Then, the terminal device 200 starts executing processing related to the measurement of the communication environment based on the changed setting (S209). At this time, the terminal device 200 may start the processing based on the changed setting immediately after reporting to the base station 100 indicated by a reference numeral S207, or may start the processing based on the changed setting after receiving the response from the base station 100 to the report. That is, after that, for example, the transmission frequency of the reference signal from the base station 100 is controlled on the basis of the changed setting, and the terminal device 200 performs measurement of the communication environment in the reference signal.

In the example illustrated in FIG. 9, the above notification from the base station 100 to the terminal device 200 indicated by a reference numeral S201 corresponds to an example of "second information" regarding the setting related to the measurement of the communication environment. Further, the above report from the terminal device 200 to the base station 100 indicated by a reference numeral S207 corresponds to an example of "first information" regarding the setting related to the measurement of the communication environment.

The request information or report information transmitted from the terminal device 200 is transmitted to the base station 100 using a predetermined uplink physical channel or uplink physical signal. Examples of the uplink physical channel or uplink physical signal used to transmit the request information or report information include PUSCH, PUCCH, PRACH, SRS, and the like.

The request information or report information is transmitted explicitly or implicitly. As an example of the explicit transmission, a part of information bits of PUSCH or PUCCH is used. As an example of the implicit transmission, a sequence pattern of a signal sequence of DMRS, PRACH, and SRS of the uplink and information are used in association with each other.

The response to the request information or report information (information expected to be received in a next step) is preferably transmitted within a predetermined time. When the response is not received within the predetermined time, the terminal device 200 may retransmit the request information or report information.

(Setting Fallback)

In a case where the switching control of the measurement setting illustrated above does not operate normally, the terminal device 200 applies initial measurement setting.

The initial measurement setting is set in advance. The initial measurement setting is preferably notified to the terminal device 200 by system information (for example, SIB).

As an example of the case where the switching control does not operate normally, there is a case where, after the terminal device 200 transmits the request information or report information a predetermined number of times, information expected to be received in a next step is not received from the base station 100.

One example of the case where the switching control does not operate normally is during RRC resetting. When the terminal device 200 receives information of a change instruction of RRC setting related to the measurement, the initial measurement setting may be applied until change completion information is returned.

When the setting is applied and the measurement is performed, the purpose may be reported to the base station 100. For example, the terminal device 200 may report a measurement result of the RRM measurement including the applied setting information to the base station 100.

(3) Supplement

Examples of the setting related to the measurement of the communication environment include measurement timing, a measurement cycle, the number of measurement samples, a center frequency of a frequency band to be measured, and the like. Of course, the above setting is merely an example, and does not limit the processing of the system according to the embodiment of the present disclosure. That is, if the setting is related to the measurement of the communication environment, the setting is not limited to the example described above and can be updated. Further, various notifications from the base station 100 to the terminal device 200 can be realized on the basis of predetermined signaling. As a specific example, the notification indicated by the reference numeral S107 in the example illustrated in FIG. 8 or the notification indicated by the reference numeral S201 in the example illustrated in FIG. 9 can be realized on the basis of the predetermined signaling.

4. Application Example

The technology according to the present disclosure can be applied to various products. For example, the base station 100 may be realized as any type of evolved Node B (eNB) such as a macro eNB or a small eNB. The small eNB may be an eNB that covers a cell smaller than a macro cell, such as a pico eNB, a micro eNB, or a home (femto) eNB. Instead, the base station 100 may be realized as another type of base station such as a NodeB or a base transceiver station (BTS). The base station 100 may include a main body (also called a base station device) that controls wireless communication and one or more remote radio heads (RRHs) that are disposed at a location different from a location of the main body. Further, various types of terminals, which will be described later, may operate as the base station 100 by temporarily or semi-permanently executing a base station function. Further, at least some of components of the base station 100 may be realized in a base station device or modules for the base station device.

Further, for example, the terminal device 200 may be realized as a smartphone, a tablet personal computer (PC), a notebook PC, a portable game terminal, a mobile terminal such as a portable/dongle type mobile router or a digital camera, or an in-vehicle terminal such as a car navigation device. Further, the terminal device 200 may be realized as a terminal (also called a machine type communication (MTC) terminal) that performs machine to machine (M2M) communication. Further, at least some of components of the terminal device 200 may be realized in a module (for example, an integrated circuit module formed of one die) mounted on the terminal.

<4.1. Application Example Related to Base Station>

First Application Example

Figure 10:
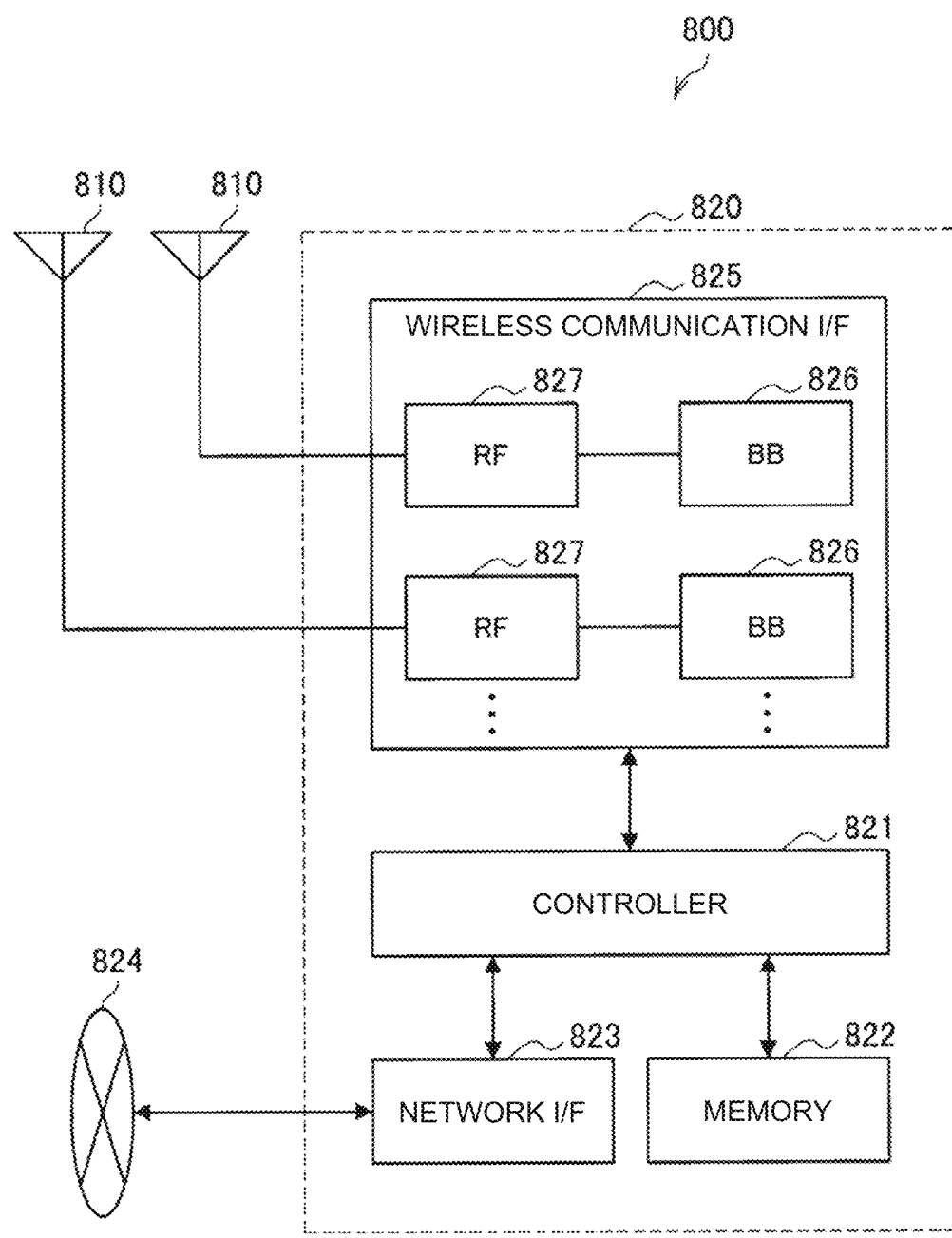
FIG. 10 is a block diagram illustrating a first example of a schematic configuration of an eNB.

FIG. 10 is a block diagram illustrating a first example of a schematic configuration of an eNB to which the technology according to the present disclosure can be applied. An eNB 800 has one or more antennas 810 and a base station device 820. Each antenna 810 and the base station device 820 can be connected to each other via an RF cable.

Each of the antennas 810 has one or more antenna elements (for example, a plurality of antenna elements forming a MIMO antenna) and is used for transmission and reception of radio signals by the base station device 820. The eNB 800 has a plurality of antennas 810 as illustrated in FIG. 10, and the plurality of antennas 810 may correspond to a plurality of frequency bands used by the eNB 800, for example. Although FIG. 10 illustrates an example in which the eNB 800 has the plurality of antennas 810, the eNB 800 may have a single antenna 810.

The base station device 820 includes a controller 821, a memory 822, a network interface 823, and a wireless communication interface 825.

The controller 821 may be, for example, a CPU or a DSP and operates various functions of upper layers of the base station device 820. For example, the controller 821 generates a data packet from data in a signal processed by the wireless communication interface 825 and transfers the generated packet via the network interface 823. The controller 821 may generate a bundled packet by bundling data from a plurality of baseband processors and transfer the generated bundled packet. Further, the controller 821 may have a logical function that executes control such as radio resource control, radio bearer control, mobility management, admission control, or scheduling. Further, the control may be executed in cooperation with a peripheral eNB or core network node. The memory 822 includes a RAM and a ROM, and stores a program executed by the controller 821 and a variety of control data (for example, a terminal list, transmitted power data, and scheduling data).

The network interface 823 is a communication interface for connecting the base station device 820 to a core network 824. The controller 821 may communicate with the core network node or other eNB via the network interface 823. In that case, the eNB 800 and the core network node or other eNB may be connected to each other by a logical interface (for example, an S1 interface or an X2 interface). The network interface 823 may be a wired communication interface or a wireless communication interface for a wireless backhaul. When the network interface 823 is a wireless communication interface, the network interface 823 may use a higher frequency band than a frequency band used by the wireless communication interface 825 for wireless communication.

The wireless communication interface 825 supports a cellular communication system such as Long Term Evolution (LTE) or LTE-Advanced, and provides wireless connection to a terminal located in the cell of the eNB 800 via the antenna 810. The wireless communication interface 825 can typically include a baseband (BB) processor 826 and an RF circuit 827. The BB processor 826 may perform, for example, encoding/decoding, modulation/demodulation, and multiplexing/demultiplexing, and executes various signal processing of each layer (for example, L1, Medium Access Control (MAC), Radio Link Control (RLC), and Packet Data Convergence Protocol (PDCP)). The BB processor 826 may have some or all of the above-mentioned logical functions instead of the controller 821. The BB processor 826 may be a module including a memory for storing a communication control program, a processor for executing the program, and related circuits, and the functions of the BB processor 826 may be changed by updating the above program. Further, the module may be a card or a blade inserted into a slot of the base station device 820, or may be a chip mounted on the card or the blade. On the other hand, the RF circuit 827 may include a mixer, a filter, and an amplifier, and transmits and receives radio signals via the antenna 810.

The wireless communication interface 825 includes a plurality of BB processors 826 as illustrated in FIG. 10, and the plurality of BB processors 826 may correspond to a plurality of frequency bands used by the eNB 800, for example. Further, the wireless communication interface 825 includes a plurality of RF circuits 827 as illustrated in FIG. 10, and the plurality of RF circuits 827 may correspond to, for example, a plurality of antenna elements. Although FIG. 10 illustrates an example in which the wireless communication interface 825 includes the plurality of BB processors 826 and the plurality of RF circuits 827, the wireless communication interface 825 may include a single BB processor 826 or a single RF circuit 827.

In the eNB 800 illustrated in FIG. 10, one or more components (for example, at least one of the communication control unit 151, the information acquisition unit 153, and the notification unit 157) included in the base station 100 described with reference to FIG. 2 may be mounted in the wireless communication interface 825. Alternatively, at least some of these components may be mounted in the controller 821. As an example, the eNB 800 may be equipped with a module including a part (for example, the BB processor 826) or all of the wireless communication interface 825 and/or the controller 821, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the eNB 800, and the wireless communication interface 825 (for example, the BB processor 826) and/or the controller 821 may execute the program. As described above, the eNB 800, the base station device 820, or the module may be provided as a device including one or more of the above components, and the program for causing the processor to function as one or more of the above components may be provided. Further, a readable recording medium on which the above program has been recorded may be provided.

Further, in the eNB 800 illustrated in FIG. 10, the wireless communication unit 120 described with reference to FIG. 2 may be mounted in the wireless communication interface 825 (for example, the RF circuit 827). Further, the antenna unit 110 may be mounted on the antenna 810. Further, the network communication unit 130 may be mounted in the controller 821 and/or the network interface 823. Further, the storage unit 140 may be mounted in the memory 822.

Second Application Example

Figure 11:
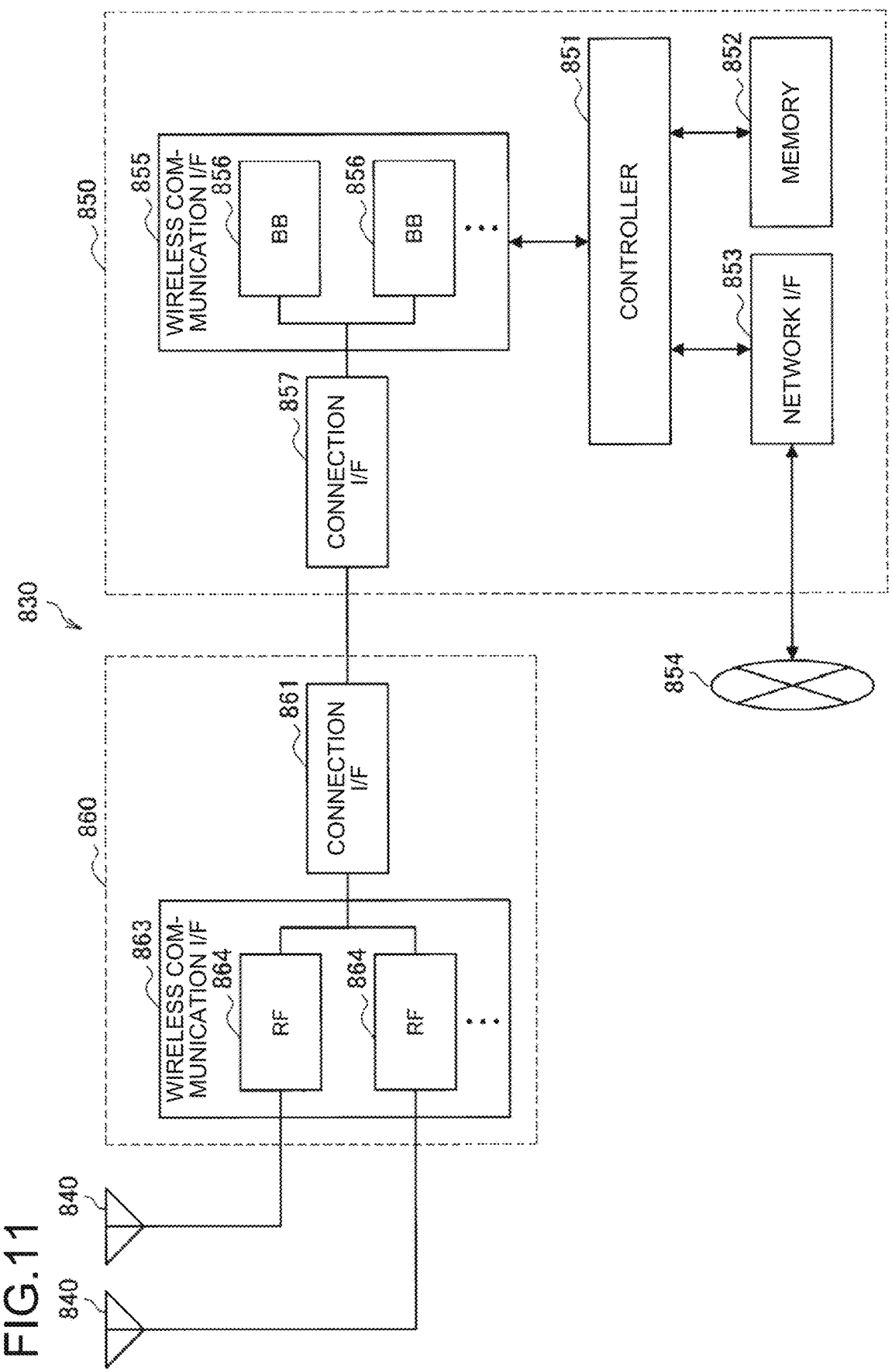
FIG. 11 is a block diagram illustrating a second example of the schematic configuration of the eNB.

FIG. 11 is a block diagram illustrating a second example of a schematic configuration of an eNB to which the technology according to the present disclosure can be applied. An eNB 830 has one or more antennas 840, a base station device 850, and an RRH 860. Each antenna 840 and the RRH 860 can be connected to each other via an RF cable. Further, the base station device 850 and the RRH 860 can be connected to each other by a high-speed line such as an optical fiber cable.

Each of the antennas 840 has one or more antenna elements (for example, a plurality of antenna elements forming a MIMO antenna) and is used for transmission and reception of radio signals by the RRH 860. The eNB 830 has a plurality of antennas 840 as illustrated in FIG. 11, and the plurality of antennas 840 may correspond to a plurality of frequency bands used by the eNB 830, for example. Although FIG. 11 illustrates an example in which the eNB 830 has the plurality of antennas 840, the eNB 830 may have a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 10.

The wireless communication interface 855 supports a cellular communication system such as LTE or LTE-Advanced, and provides wireless connection to terminals located in a sector corresponding to the RRH 860 via the RRH 860 and the antenna 840. The wireless communication interface 855 can typically include a BB processor 856 and the like. The BB processor 856 is similar to the BB processor 826 described with reference to FIG. 10, except that it is connected to a RF circuit 864 of the RRH 860 via the connection interface 857. The wireless communication interface 855 includes a plurality of BB processors 856 as illustrated in FIG. 10, and the plurality of BB processors 856 may correspond to a plurality of frequency bands used by the eNB 830, for example. Although FIG. 11 illustrates an example in which the wireless communication interface 855 includes the plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high-speed line that connects the base station device 850 (wireless communication interface 855) and the RRH 860.

The RRH 860 further includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives radio signals via the antenna 840. The wireless communication interface 863 can typically include an RF circuit 864 and the like. The RF circuit 864 may include a mixer, a filter, and an amplifier, and transmits and receives radio signals via the antenna 840. The wireless communication interface 863 includes a plurality of RF circuits 864 as illustrated in FIG. 11, and the plurality of RF circuits 864 may correspond to, for example, a plurality of antenna elements. Although FIG. 11 illustrates an example in which the wireless communication interface 863 includes the plurality of RF circuits 864, the wireless communication interface 863 may include a single RF circuit 864.

In the eNB 830 illustrated in FIG. 11, one or more components (for example, at least one of the communication control unit 151, the information acquisition unit 153, and the notification unit 157) included in the base station 100 described with reference to FIG. 2 may be mounted in the wireless communication interface 855 and/or the wireless communication interface 863. Alternatively, at least some of these components may be mounted in the controller 851. As an example, the eNB 830 may be equipped with a module including a part (for example, the BB processor 856) or all of the wireless communication interface 855 and/or the controller 851, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the eNB 830, and the wireless communication interface 855 (for example, the BB processor 856) and/or the controller 851 may execute the program. As described above, the eNB 830, the base station device 850, or the module may be provided as a device including one or more of the above components, and the program for causing the processor to function as one or more of the above components may be provided. Further, a readable recording medium on which the above program has been recorded may be provided.

Further, in the eNB 830 illustrated in FIG. 11, for example, the wireless communication unit 120 described with reference to FIG. 2 may be mounted in the wireless communication interface 863 (for example, the RF circuit 864). Further, the antenna unit 110 may be mounted on the antenna 840. Further, the network communication unit 130 may be mounted in the controller 851 and/or the network interface 853. Further, the storage unit 140 may be mounted in the memory 852.

<4.2. Application Example Related to Terminal Device>

First Application Example

Figure 12:
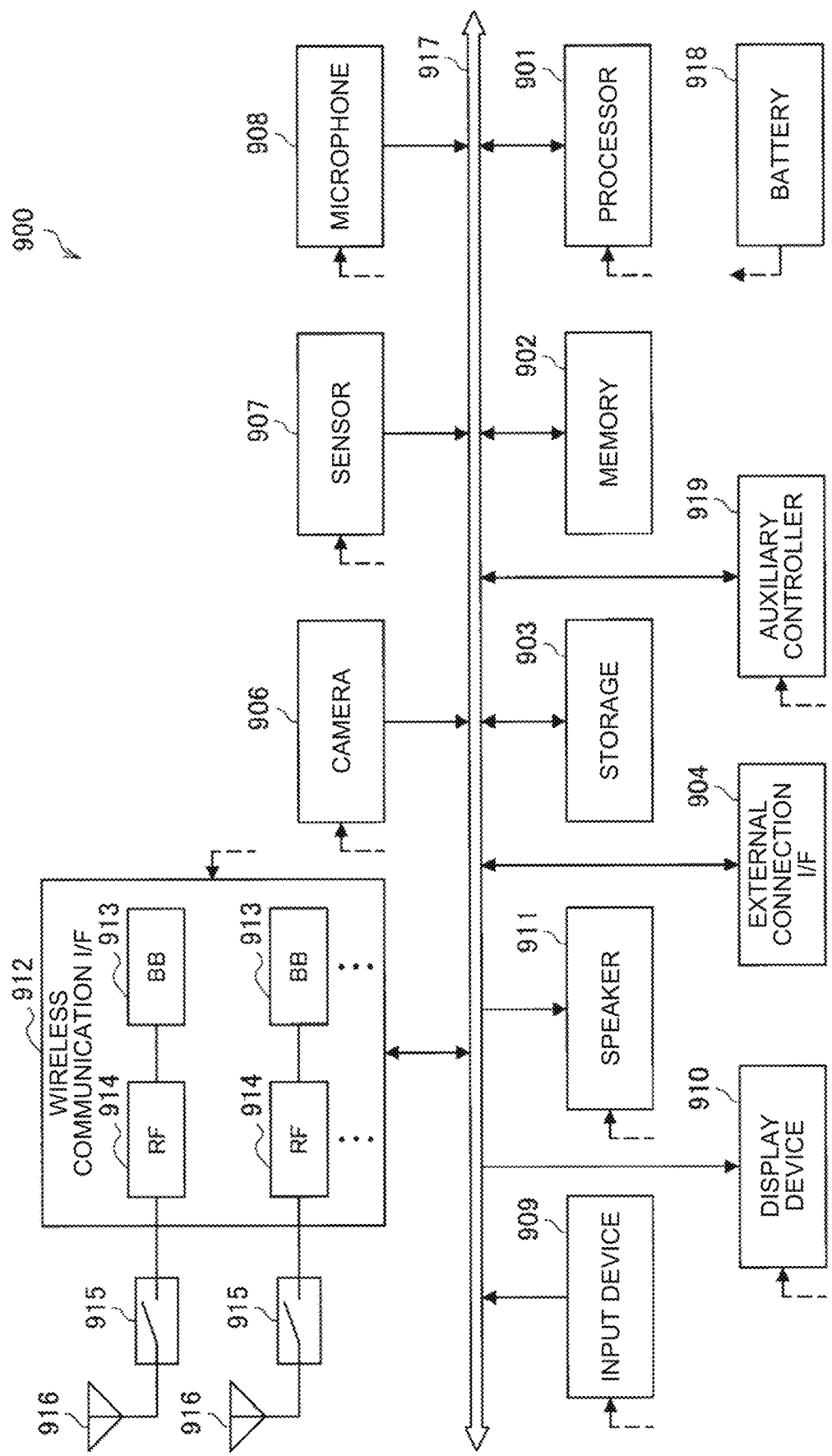
FIG. 12 is a block diagram illustrating an example of a schematic configuration of a smartphone.

FIG. 12 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a System on Chip (SoC), and controls functions of an application layer and other layers of the smartphone 900. The memory 902 includes a RAM and a ROM and stores programs and data executed by the processor 901. The storage 903 can include a storage medium such as a semiconductor memory or a hard disk. The external connection interface 904 is an interface for connecting an external device such as a memory card or a universal serial bus (USB) device to the smartphone 900.

The camera 906 has an imaging element such as a charge coupled device (CCD) or a complementary metal oxide semiconductor (CMOS), and generates an imaging image.

The sensor 907 can include, for example, a group of sensors such as a positioning sensor, a gyro sensor, a geomagnetic sensor, and an acceleration sensor. The microphone 908 converts a voice input to the smartphone 900 into a voice signal. The input device 909 includes, for example, a touch sensor that detects a touch on a screen of the display device 910, a keypad, a keyboard, a button, or a switch, and receives an operation or information input from a user. The display device 910 has a screen such as a liquid crystal display (LCD) or an organic light emitting diode (OLED) display, and displays an output image of the smartphone 900. The speaker 911 converts the voice signal output from the smartphone 900 into a voice.

The wireless communication interface 912 supports a cellular communication system such as LTE or LTE-Advanced and performs wireless communication. The wireless communication interface 912 can typically include a BB processor 913 and an RF circuit 914. The BB processor 913 may perform, for example, encoding/decoding, modulation/demodulation, and multiplexing/demultiplexing, and executes various signal processing for wireless communication. On the other hand, the RF circuit 914 may include a mixer, a filter, and an amplifier, and transmits and receives radio signals via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 12. Although FIG. 12 illustrates an example in which the wireless communication interface 912 includes the plurality of BB processors 913 and the plurality of RF circuits 914, the wireless communication interface 912 may include a single BB processor 913 or a single RF circuit 914.

Further, the wireless communication interface 912 may support other types of wireless communication systems such as a short-range wireless communication system, a near-field wireless communication system, or a wireless local area network (LAN) system, in addition to the cellular communication system. In that case, the wireless communication interface 912 may include the BB processor 913 and the RF circuit 914 for each wireless communication system.

Each of the antenna switches 915 switches the connection destination of the antenna 916 between a plurality of circuits included in the wireless communication interface 912 (for example, circuits for different wireless communication systems).

Each of the antennas 916 has one or more antenna elements (for example, a plurality of antenna elements forming a MIMO antenna) and is used for transmission and reception of radio signals by the wireless communication interface 912. The smartphone 900 may have a plurality of antennas 916 as illustrated in FIG. 12. Although FIG. 12 illustrates an example in which the smartphone 900 has the plurality of antennas 916, the smartphone 900 may have a single antenna 916.

Further, the smartphone 900 may include the antenna 916 for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 12 via a feed line partially illustrated by a broken line in the drawing. The auxiliary controller 919 operates minimum necessary functions of the smartphone 900, for example, in a sleep mode.

In the smartphone 900 illustrated in FIG. 12, one or more components (for example, at least one of the communication control unit 241, the information acquisition unit 243, the measurement unit 245, and the notification unit 247) included in the terminal device 200 described with reference to FIG. 3 may be mounted in the wireless communication interface 912. Alternatively, at least some of these components may be mounted in the processor 901 or the auxiliary controller 919. As an example, the smartphone 900 may be equipped with a module including a part (for example, the BB processor 913) or all of the wireless communication interface 912, the processor 901, and/or the auxiliary controller 919, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the smartphone 900, and the wireless communication interface 912 (for example, the BB processor 913), the processor 901, and/or the auxiliary controller 919 may execute the program. As described above, the smartphone 900 or the module may be provided as a device including one or more of the above components, and the program for causing the processor to function as one or more of the above components may be provided. Further, a readable recording medium on which the above program has been recorded may be provided.

Further, in the smartphone 900 illustrated in FIG. 12, for example, the wireless communication unit 220 described with reference to FIG. 3 may be mounted in the wireless communication interface 912 (for example, the RF circuit 914). Further, the antenna unit 210 may be mounted on the antenna 916. Further, the storage unit 230 may be mounted in the memory 902.

Second Application Example

FIG. 13 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or SoC, and controls a navigation function and other functions of the car navigation device 920. The memory 922 includes a RAM and a ROM and stores programs and data executed by the processor 921.

The GPS module 924 uses GPS signals received from GPS satellites to measure a position (for example, the latitude, the longitude, and the altitude) of the car navigation device 920. The sensor 925 can include, for example, a group of sensors such as a gyro sensor, a geomagnetic sensor, and a barometric pressure sensor. The data interface 926 is connected to an in-vehicle network 941 via a terminal (not illustrated), and acquires data generated on the vehicle side such as vehicle speed data.

The content player 927 plays contents stored in a storage medium (for example, a CD or a DVD) inserted into the storage medium interface 928. The input device 929 includes, for example, a touch sensor that detects a touch on the screen of the display device 930, a button, or a switch, and receives an operation or information input from the user. The display device 930 has a screen such as an LCD or OLED display and displays an image of a navigation function or contents to be played. The speaker 931 outputs a voice of the navigation function or the contents to be played.

The wireless communication interface 933 supports a cellular communication system such as LTE or LTE-Advanced and performs wireless communication. The wireless communication interface 933 can typically include a BB processor 934 and an RF circuit 935. The BB processor 934 may perform, for example, encoding/decoding, modulation/demodulation, and multiplexing/demultiplexing, and executes various signal processing for wireless communication. On the other hand, the RF circuit 935 may include a mixer, a filter, and an amplifier, and transmits and receives radio signals via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 13. Although FIG. 13 illustrates an example in which the wireless communication interface 933 includes the plurality of BB processors 934 and the plurality of RF circuits 935, the wireless communication interface 933 may include a single BB processor 934 or a single RF circuit 935.

Further, the wireless communication interface 933 may support other types of wireless communication systems such as a short-range wireless communication system, a near-field wireless communication system, or a wireless LAN system, in addition to the cellular communication system. In that case, the wireless communication interface 933 may include the BB processor 934 and the RF circuit 935 for each wireless communication system.

Each of the antenna switches 936 switches the connection destination of the antenna 937 between a plurality of circuits included in the wireless communication interface 933 (for example, circuits for different wireless communication systems).

Each of the antennas 937 has one or more antenna elements (for example, a plurality of antenna elements forming a MIMO antenna) and is used for transmission and reception of radio signals by the wireless communication interface 933. The car navigation device 920 may have a plurality of antennas 937 as illustrated in FIG. 13. Although FIG. 13 illustrates an example in which the car navigation device 920 has the plurality of antennas 937, the car navigation device 920 may have a single antenna 937.

Further, the car navigation device 920 may include the antenna 937 for each wireless communication system. In that case, the antenna switch 936 may be omitted from the configuration of the car navigation device 920.

The battery 938 supplies power to each block of the car navigation device 920 illustrated in FIG. 13 via a feed line partially illustrated by a broken line in the drawing. Further, the battery 938 stores power supplied from the vehicle side.

In the car navigation device 920 illustrated in FIG. 13, one or more components (for example, at least one of the communication control unit 241, the information acquisition unit 243, the measurement unit 245, and the notification unit 247) included in the terminal device 200 described with reference to FIG. 3 described with reference to FIG. 3 may be mounted in the wireless communication interface 933. Alternatively, at least some of these components may be mounted in the processor 921. As an example, the car navigation device 920 may be equipped with a module including a part (for example, the BB processor 934) or all of the wireless communication interface 933 and/or the processor 921, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the car navigation device 920, and the wireless communication interface 933 (for example, the BB processor 934) and/or the processor 921 may execute the program. As described above, the car navigation device 920 or the module may be provided as a device including one or more of the above components, and the program for causing the processor to function as one or more of the above components may be provided. Further, a readable recording medium on which the above program has been recorded may be provided.

Further, in the car navigation device 920 illustrated in FIG. 13, for example, the wireless communication unit 220 described with reference to FIG. 3 may be mounted in the wireless communication interface 933 (for example, the RF circuit 935). Further, the antenna unit 210 may be mounted on the antenna 937. Further, the storage unit 230 may be mounted in the memory 922.

Further, the technology according to the present disclosure may be realized as an in-vehicle system (or a vehicle) 940 including one or more blocks of the car navigation device 920 described above, the in-vehicle network 941, and a vehicle-side module 942. The vehicle-side module 942 generates vehicle-side data such as a vehicle speed, an engine speed, or failure information, and outputs the generated data to the in-vehicle network 941.

5. Conclusion

As described above, in the system according to the embodiment of the present disclosure, the terminal device includes the communication unit performing the wireless communication, the notification unit, and the acquisition unit. The notification unit notifies another communication device of the first information regarding the setting related to the measurement of the communication environment with the other communication device (for example, the base station) that transmits the reference signal, on the basis of the predetermined conditions. The acquisition unit acquires the second information regarding the above setting from the other communication device. Further, the base station includes the communication unit performing the wireless communication, the notification unit, the acquisition unit, and the control unit. The acquisition unit acquires the first information regarding the setting related to the measurement of the communication environment with the terminal device that is transmitted from the terminal device on the basis of the predetermined conditions. The notification unit notifies the terminal device of the second information regarding the above setting. The control unit performs control so that the reference signal that can be used for the measurement is transmitted according to the above setting.

With the above configuration, when the setting related to the measurement of the communication environment is changed, each of the base station and the terminal device can recognize the information related to the setting. Therefore, for example, even when there is a possibility that the reference signal that can be used to measure the communication environment is not included in some slots, like NR, the terminal device side can perform the measurement using the reference signal in accordance with the transmission moment of the reference signal by the base station. That is, according to the system according to the embodiment of the present disclosure, even in the communication environment where NR is applied, it is possible to more suitably control the measurement of the communication environment (for example, adaptively control the measurement frequency of the communication environment) according to the situation at each time. Therefore, it is possible to prevent occurrence of a situation where the above measurement is performed more than necessary in the terminal device 200, and as a result, it is possible to suppress an increase in the power consumption of the terminal device 200.

The preferred embodiments of the present disclosure have been described in detail with reference to the accompanying drawings, but the technical scope of the present disclosure is not limited to such examples. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

For example, in the example described above, the explanation has been given focusing on the communication between the terminal device 200 and the base station 100. However, a communication partner of the terminal device 200 is not necessarily limited to the base station 100 as long as it is a communication device that transmits a reference signal that can be used to measure the communication environment. As a specific example, another terminal device that transmits the reference signal, such as a so-called master terminal, may be the communication partner of the terminal device 200. That is, a communication device that transmits the reference signal, such as the base station 100 or the master terminal described above, corresponds to an example of "another communication device" that is the communication partner of the terminal device 200.

Furthermore, the effects described in the present specification are merely illustrative or exemplary and are not restrictive. That is, the technology according to the present disclosure can exhibit other effects obvious to those skilled in the art from the description of the present specification in addition to or in place of the above effects.

Note that the following configurations also belong to the technical scope of the present disclosure.

(1)
A communication device comprising:
a communication unit that performs wireless communication;
a notification unit that notifies another communication device of first information regarding setting related to measurement of a communication environment with the other communication device transmitting a reference signal, on the basis of predetermined conditions; and
an acquisition unit that acquires second information regarding the setting from the other communication device.

(2)
The communication device according to (1), wherein
the notification unit notifies the other communication device of a request for changing the setting as the first information, and
after the first information is notified to the other communication device, the acquisition unit acquires, as the second information, information according to an application result of the setting from the other communication device.

(3)
The communication device according to (1), wherein
the acquisition unit acquires, as the second information, information regarding a plurality of candidates of the setting from the other communication device, and
the notification unit notifies the other communication device of information regarding a candidate selected from the plurality of candidates on the basis of the predetermined conditions, as the first information.

(4)
The communication device according to any one of (1) to (3), wherein the second information is notified from the other communication device on the basis of predetermined signaling.

(5)
The communication device according to any one of (1) to (4), further comprising:
a measurement unit that performs the measurement, wherein
after the first information is notified to the other communication device, the measurement unit applies the setting according to the first information to the measurement.

(6)
The communication device according to (5), wherein the measurement unit starts the measurement based on the setting according to the first information, on the basis of an instruction from the other communication device.

(7)
The communication device according to (6), wherein the measurement unit ends the measurement based on the setting according to the first information, on the basis of an instruction from the other communication device.

(8)
The communication device according to (5), wherein the measurement unit performs the measurement on the basis of the reference signal transmitted from the other communication device at timing according to the first information.

(9)
The communication device according to (5), wherein
the measurement unit
performs the measurement on the basis of
a reference signal transmitted every predetermined period, and
a reference signal transmitted from the other communication device at timing according to the first information.

(10)
The communication device according to any one of (1) to (9), wherein
the notification unit notifies the other communication device of the first information, according to a measurement result of a speed of the communication device, and
the setting corresponding to the first information is controlled so that a cycle of the measurement is shorter when the speed is higher.

(11)
The communication device according to any one of (1) to (9), wherein
the notification unit notifies the other communication device of the first information, according to a measurement result of a position of the communication device, and
the setting corresponding to the first information is controlled so that the number of adjacent cells to be measured is larger when the position of the communication device is farther from a center of a cell.

(12)
The communication device according to any one of (1) to (9), wherein
the notification unit notifies the other communication device of the first information, according to a frequency of the reference signal to be measured, and
the setting corresponding to the first information is controlled so that the measurement frequency is higher when the frequency is higher.

(13)
The communication device according to any one of (1) to (9), wherein
the notification unit notifies the other communication device of the first information, according to received power of radio signals transmitted from the other communication device, and
the setting corresponding to the first information is controlled so that the number of adjacent cells to be measured is larger when the received power is lower.

(14)
The communication device according to any one of (1) to (9), wherein
the notification unit notifies the other communication device of the first information, according to received power of radio signals transmitted from adjacent cells, and
the setting corresponding to the first information is controlled so that the number of adjacent cells to be measured is larger when the received power is higher.

(15)
The communication device according to any one of (1) to (9), wherein
the notification unit notifies the other communication device of the first information, according to a packet or traffic type, and
the setting corresponding to the first information is controlled so that the measurement frequency is higher when a packet or traffic where a low latency request is higher arrives.

(16)
The communication device according to any one of (1) to (9), wherein
the notification unit notifies the other communication device of the first information, according to setting of accessibility, and
the setting corresponding to the first information is controlled so that the measurement frequency is higher when accessibility of traffic to be processed is higher.

(17)
The communication device according to any one of (1) to (9), wherein
the notification unit notifies the other communication device of the first information, according to a state of a battery, and the setting corresponding to the first information is controlled so that the measurement frequency is lower when power charged in the battery is lower.

(18)
The communication device according to any one of (1) to (9), wherein
the notification unit notifies the other communication device of the first information, according to capability of the communication device, and
the setting corresponding to the first information is controlled so that the measurement frequency is higher when processing capability of the communication device for the wireless communication is higher.

(19)
The communication device according to any one of (1) to (9), wherein
the notification unit notifies the other communication device of the first information, according to maximum transmission power of the communication device, and
the setting corresponding to the first information is controlled so that the measurement frequency is higher when the maximum transmission power is higher.

(20)
A communication device comprising:
a communication unit that performs wireless communication;
an acquisition unit that acquires first information regarding setting related to measurement of a communication environment with a terminal device, which is transmitted from the terminal device on the basis of predetermined conditions;
a notification unit that notifies the terminal device of second information regarding the setting; and
a control unit that performs control so that a reference signal used for the measurement is transmitted according to the setting.

(21)
The communication device according to (20), wherein
the acquisition unit acquires, as the first information, a request for changing the conditions from the terminal device,
the control unit determines the setting to be applied to the transmission of the reference signal, according to the first information, and
the notification unit notifies the terminal device of information according to an application result of the setting as the second information.

(22)
The communication device according to (20), wherein
the notification unit notifies the terminal device of information regarding a plurality of candidates of the setting as the second information,
after the second information is notified to the terminal device, the acquisition unit acquires, as the first information, information regarding a candidate selected from the plurality of candidates on the basis of the predetermined conditions from the terminal device, and
the control unit controls the transmission of the reference signal according to the first information.

(23)
A communication method, by a computer, comprising:
performing wireless communication;
notifying another communication device of first information regarding setting related to measurement of a communication environment with the other communication device transmitting a reference signal, on the basis of predetermined conditions; and acquiring second information regarding the setting from the other communication device.

(24) A communication method, by a computer, comprising:
performing wireless communication;
acquiring first information regarding setting related to measurement of a communication environment with a terminal device, which is transmitted from the terminal device on the basis of predetermined conditions;
notifying the terminal device of second information regarding the setting; and
performing control so that a reference signal used for the measurement is transmitted according to the setting.

(25) A program for causing a computer to execute:
performing wireless communication;
notifying another communication device of first information regarding setting related to measurement of a communication environment with the other communication device transmitting a reference signal, on the basis of predetermined conditions; and
acquiring second information regarding the setting from the other communication device.

(26) A program for causing a computer to execute:
performing wireless communication;
acquiring first information regarding setting related to measurement of a communication environment with a terminal device, which is transmitted from the terminal device on the basis of predetermined conditions;
notifying the terminal device of second information regarding the setting; and
performing control so that a reference signal used for the measurement is transmitted according to the setting.

REFERENCE SIGNS LIST

1 SYSTEM
100 BASE STATION
110 ANTENNA UNIT
120 WIRELESS COMMUNICATION UNIT
130 NETWORK COMMUNICATION UNIT
140 STORAGE UNIT
150 CONTROL UNIT
151 COMMUNICATION CONTROL UNIT
153 INFORMATION ACQUISITION UNIT
157 NOTIFICATION UNIT
200 TERMINAL DEVICE
210 ANTENNA UNIT
220 WIRELESS COMMUNICATION UNIT
230 STORAGE UNIT
240 CONTROL UNIT
241 COMMUNICATION CONTROL UNIT
243 INFORMATION ACQUISITION UNIT
245 MEASUREMENT UNIT
247 NOTIFICATION UNIT

The invention claimed is:

1. A communication device comprising:
a wireless transceiver; and
processing circuitry configured to:
notify another communication device of first information regarding a setting related to a measurement of a communication environment with the other communication device transmitting a reference signal, on the basis of predetermined conditions; and
acquire second information regarding the setting from the other communication device,
wherein the predetermined conditions include at least one of:
a packet or traffic type,
an accessibility setting, or
a maximum transmission power of the communication device, and
wherein the processing circuitry is further configured to respectively control the setting corresponding to the first information so that:
the measurement frequency is higher when a packet or traffic where a low latency request is higher arrives,
the measurement frequency is higher when an accessibility of traffic to be processed is higher, or
the measurement frequency is higher when the maximum transmission power is higher.

2. The communication device according to claim 1, wherein the processing circuitry is further configured to:
notify the other communication device of a request for changing the setting as the first information, and
after the first information is notified to the other communication device, acquire, as the second information, information according to an application result of the setting from the other communication device.

3. The communication device according to claim 1, wherein the processing circuitry is further configured to:
acquire, as the second information, information regarding a plurality of candidates of the setting from the other communication device, and
notify the other communication device of information regarding a candidate selected from the plurality of candidates on the basis of the predetermined conditions, as the first information.

4. The communication device according to claim 1, wherein the second information is notified from the other communication device on the basis of predetermined signaling.

5. The communication device according to claim 1, wherein the processing circuitry is further configured to:
perform the measurement, wherein
after the first information is notified to the other communication device, apply the setting according to the first information to the measurement.

6. The communication device according to claim 5, wherein the processing circuitry is further configured to start the measurement based on the setting according to the first information, on the basis of an instruction from the other communication device.

7. The communication device according to claim 6, wherein the processing circuitry is further configured to end the measurement based on the setting according to the first information, on the basis of an instruction from the other communication device.

8. The communication device according to claim 5, wherein the processing circuitry is further configured to perform the measurement on the basis of the reference signal transmitted from the other communication device at timing according to the first information.

9. The communication device according to claim 5, wherein the processing circuitry is further configured to perform the measurement on the basis of
a reference signal transmitted every predetermined period, and
a reference signal transmitted from the other communication device at timing according to the first information.

10. The communication device according to claim 1,
wherein the predetermined conditions further include a measurement result of a speed of the communication device, and
wherein the processing circuitry is further configured to control the setting corresponding to the first information so that a cycle of the measurement is shorter when the speed is higher.

11. The communication device according to claim 1,
wherein the predetermined conditions further include a measurement result of a position of the communication device, and
wherein the processing circuitry is further configured to control the setting corresponding to the first information so that the number of adjacent cells to be measured is larger when the position of the communication device is farther from a center of a cell.

12. The communication device according to claim 1,
wherein the predetermined conditions further include a frequency of the reference signal to be measured, and
wherein the processing circuitry is further configured to control the setting corresponding to the first information so that the measurement frequency is higher when the frequency is higher.

13. The communication device according to claim 1
wherein the predetermined conditions further include a received power of radio signals transmitted from the other communication device, and
wherein the processing circuitry is further configured to control the setting corresponding to the first information so that the number of adjacent cells to be measured is larger when the received power is lower.

14. The communication device according to claim 1,
wherein the predetermined conditions further include a received power of radio signals transmitted from adjacent cells, and
wherein the processing circuitry is further configured to control the setting corresponding to the first information so that the number of adjacent cells to be measured is larger when the received power is higher.

15. The communication device according to claim 1,
wherein the predetermined conditions further include a state of a battery, and
wherein the processing circuitry is further configured to control the setting corresponding to the first information so that the measurement frequency is lower when power charged in the battery is lower.

16. The communication device according to claim 1,
wherein the predetermined conditions further include a capability of the communication device, and
wherein the processing circuitry is further configured to control the setting corresponding to the first information so that the measurement frequency is higher when processing capability of the communication device for the wireless communication is higher.

17. A communication device comprising:
a wireless transceiver; and
processing circuitry configured to:
acquire first information regarding a setting related to a measurement of a communication environment with a terminal device, which is transmitted from the terminal device on the basis of predetermined conditions,
wherein the predetermined conditions include at least one of:
a packet or traffic type,
an accessibility setting, or
a maximum transmission power of the communication device:
notify the terminal device of second information regarding the setting; and
perform control so that a reference signal used for the measurement is transmitted according to the setting so that:
the measurement frequency is higher when a packet or traffic where a low latency request is higher arrives,
the measurement frequency is higher when an accessibility of traffic to be processed is higher, or
the measurement frequency is higher when the maximum transmission power is higher, respectively.

18. The communication device according to claim 17,
wherein the processing circuitry is further configured to:
acquire, as the first information, a request for changing the conditions from the terminal device,
determine the setting to be applied to the transmission of the reference signal, according to the first information, and
notify the terminal device of information according to an application result of the setting as the second information.

19. The communication device according to claim 17,
wherein the processing circuitry is further configured to:
notify the terminal device of information regarding a plurality of candidates of the setting as the second information,
after the second information is notified to the terminal device, acquire, as the first information, information regarding a candidate selected from the plurality of candidates on the basis of the predetermined conditions from the terminal device, and
control the transmission of the reference signal according to the first information.

20. A communication method, by a computer, comprising:
performing wireless communication;
notifying another communication device of first information regarding a setting related to a measurement of a communication environment with the other communication device transmitting a reference signal, on the basis of predetermined conditions;
acquiring second information regarding the setting from the other communication device;
wherein the predetermined conditions include at least one of;
a packet or traffic type,
an accessibility setting, or
a maximum transmission power of the communication device; and
wherein the method further comprise respectively controlling the setting corresponding to the first information so that:
the measurement frequency is higher when a packet or traffic where a low latency request is higher arrives,
the measurement frequency is higher when an accessibility of traffic to be processed is higher, or
the measurement frequency is higher when the maximum transmission power is higher.

21. A communication method, by a computer, comprising:
performing wireless communication;
acquiring first information regarding a setting related to a measurement of a communication environment with a terminal device, which is transmitted from the terminal device on the basis of predetermined conditions, wherein the predetermined conditions include at least one of:
a packet or traffic type,
an accessibility setting, or
a maximum transmission power of the communication device:

notifying the terminal device of second information regarding the setting; and performing control so that a reference signal used for the measurement is transmitted according to the setting so that:

the measurement frequency is higher when a packet or traffic where a low latency request is higher arrives, the measurement frequency is higher when an accessibility of traffic to be processed is higher, or the measurement frequency is higher when the maximum transmission power is higher, respectively.

22. A non-transitory computer product containing a program for causing a computer to execute:

performing wireless communication;

notifying another communication device of first information regarding setting related to measurement of a communication environment with the other communication device transmitting a reference signal, on the basis of predetermined conditions; and acquiring second information regarding the setting from the other communication device, wherein the predetermined conditions include at least one of:
a packet or traffic type,
an accessibility setting, or
a maximum transmission power of the communication device, and wherein the processing circuitry is further configured to respectively control the setting corresponding to the first information so that:

the measurement frequency is higher when a packet or traffic where a low latency request is higher arrives, the measurement frequency is higher when an accessibility of traffic to be processed is higher, or the measurement frequency is higher when the maximum transmission power is higher.

23. A non-transitory computer product containing a program for causing a computer to execute:

performing wireless communication;

acquiring first information regarding a setting related to a measurement of a communication environment with a terminal device, which is transmitted from the terminal device on the basis of predetermined conditions, wherein the predetermined conditions include at least one of:
a packet or traffic type,
an accessibility setting, or
a maximum transmission power of the communication device:

notifying the terminal device of second information regarding the setting; and performing control so that a reference signal used for the measurement is transmitted according to the setting so that:

the measurement frequency is higher when a packet or traffic where a low latency request is higher arrives, the measurement frequency is higher when an accessibility of traffic to be processed is higher, or the measurement frequency is higher when the maximum transmission power is higher, respectively.

* * * * *